(12) United States Patent
Watanabe et al.

(10) Patent No.: US 6,839,113 B2
(45) Date of Patent: Jan. 4, 2005

(54) LIQUID CRYSTAL DISPLAY DEVICE

(75) Inventors: Makoto Watanabe, Tokyo (JP);
Takahiko Watanabe, Tokyo (JP);
Fuminori Tamura, Tokyo (JP)

(73) Assignee: NEC LCD Technologies, Ltd., Kanagawa (JP)

(*) Notice: Subject to any disclaimer, the term of this patent is extended or adjusted under 35 U.S.C. 154(b) by 0 days.

(21) Appl. No.: 09/364,423

(22) Filed: Jul. 30, 1999

(65) Prior Publication Data

US 2003/0112393 A1 Jun. 19, 2003

(30) Foreign Application Priority Data

Jul. 30, 1998 (JP) ............................................ 10-215369

(51) Int. Cl.[7] ..................... G02F 1/1343; G02F 1/1333; G02F 1/1337
(52) U.S. Cl. ..................... 349/141; 349/129; 349/110
(58) Field of Search ................................ 349/141–143, 349/110, 139, 123–124, 129

(56) References Cited

U.S. PATENT DOCUMENTS 6,064,460 A * 5/2000 Ohta et al. ............... 349/141
6,313,898 B1 * 11/2001 Numano et al. .......... 349/129
6,323,926 B2 * 11/2001 Watanabe et al. ........ 349/130

FOREIGN PATENT DOCUMENTS

| EP | 0 485 017 A2 | 5/1992 |
|---|---|---|
| EP | 0 732 612 A1 | 9/1996 |
| EP | 0 827 010 A2 | 3/1998 |
| EP | 0 855 613 A2 | 7/1998 |
| JP | 062 144133 | 6/1987 |
| JP | 07036058 | 2/1995 |
| JP | 08 146386 | 6/1996 |
| JP | 10-48652 | * 2/1998 |

* cited by examiner

Primary Examiner—Dung Nguyen
(74) Attorney, Agent, or Firm—Scully, Scott, Murphy & Presser

(57) ABSTRACT

An IPS (In-Plane Switching) liquid crystal display is disclosed that maintains excellent display uniformity and high aperture ratio as well as high yield during fabrication, and that includes a first transparent substrate, a second transparent substrate arranged to confront the first transparent substrate and provided with a second alignment layer, and a liquid crystal component sealed between the first transparent substrate and second transparent substrate. The first transparent substrate is provided with: a transparent insulating substrate, pixel electrodes and common electrodes that are arranged alternately and substantially parallel to each other on the transparent insulating substrate, a plurality of pixels arranged in matrix form, scan lines and switching elements for controlling the electric field applied to the pixel electrodes, signal lines, and a first alignment layer. The direction of initial orientation of liquid crystal molecules in the aperture regions has an inclination of any angle θ other than 0° and 90° with respect to the longitudinal direction of the pixel electrodes. In regions other than the aperture regions, the direction of initial orientation of the liquid crystal molecules is orthogonal to the longitudinal direction of the pixel electrodes when the dielectric constant anisotropy of the liquid crystal molecules is positive, and parallel to the longitudinal direction of pixel electrodes when the dielectric constant anisotropy is negative.

27 Claims, 28 Drawing Sheets

LIQUID CRYSTAL DISPLAY DEVICE

BACKGROUND OF THE INVENTION

1. Field of the Invention

The present invention relates to a horizontal-field-drive liquid crystal display, and particularly to a horizontal-field-drive liquid crystal display device that maintains a high aperture ratio while suppressing the occurrence of display defects such as vertical crosstalk and stepping non-uniformity.

2. Description of the Related Art

Liquid crystal displays of the prior art are typically of a type in which an image is displayed on a panel by causing an electric field to act in the direction perpendicular to the substrate surface, causing change in the alignment of the director (molecular axis) of the liquid crystal molecules, and thus controlling the transmittivity of light (hereinbelow, this type is referred to as "vertical-field-drive"). Twisted Nematic (TN) mode is representative of this type. In liquid crystal displays of this vertical-field-drive type, the director is aligned perpendicular to the substrate surface when the field is being applied. As a result, the refractive index changes with the direction of viewing, thereby strengthening the viewing angle dependency and making a wide viewing angle difficult to obtain.

In contrast, recent years have seen research and development of horizontal-field-drive liquid crystal displays or IPS (In-Plane Switching) mode liquid crystal displays in which image display is realized through the control of the transmittivity of light by aligning the director of liquid crystal molecules parallel to the substrate surface, and causing an electric field to act in a direction parallel to the substrate surface to cause the director to rotate within a plane parallel to the substrate surface.

As an example of a typical horizontal-field-drive liquid crystal display (hereinbelow referred to as simply "IPS liquid crystal display" or merely, "liquid crystal display"), the construction of an IPS liquid crystal display described in Japanese Patent Laid-open No. 36058/95 is next described with reference to FIG. 1 and FIG. 2. FIG. 1 is a plan view showing the structure of one pixel of the IPS liquid crystal display, and FIG. 2 is a sectional view showing the layer structure of the IPS liquid crystal display at line V—V of FIG. 1.

Prior-art IPS liquid crystal display 10 has a plurality of pixels arranged in matrix form. As shown in FIG. 2, the display is provided with first transparent substrate (TFT substrate) 13, second transparent substrate (facing substrate) 15, and liquid crystal component layer 44 sealed between first transparent substrate 13 and second transparent substrate 15.

First transparent substrate 13 is provided with first glass substrate 12 on which electrodes (16, 20, 22) and switching structures (30, 32) are formed, and first alignment layer 28 is formed on the highest layer. Second transparent substrate (facing substrate) 15 is provided with second glass substrate 14, light-shielding layer 36, and second alignment layer 42, which are formed successively on second glass substrate 14. Second transparent substrate 15 is arranged such that second alignment layer 42 is parallel to and confronts first alignment layer 28 of first transparent substrate 13.

Further, as shown in FIG. 1 and FIG. 2, electrodes (16, 20, 22) are made up of, for each pixel, two common electrodes 16A and 16B, first insulating film 18 formed over common electrodes 16, signal line (drain line) 20, and pixel electrode 22. The two common electrodes 16A and 16B extend over first glass substrate 12 separated from and parallel to each other. Signal line 20 extends parallel to common electrodes 16 and is positioned over first insulating film 18 and between common electrode 16B of one pixel and common electrode 16A of the neighboring pixel. Pixel electrode 22, similar to signal line 20, extends parallel to common electrodes 16 and is positioned over first insulating film 18 and between common electrodes 16A and 16B. Common electrodes 16A and 16B are each connected to common line 24.

First alignment layer 28 is stacked over signal line 20 and pixel electrode 22 with second insulating film 26 interposed. Pixel electrodes 22 and common electrodes 16 are actually alternately arranged so as to form a plurality of pairs.

The switching mechanism (30 and 32) is made up of thin-film transistor 32 and scan line 30, which drives thin-film transistor 32.

The gate electrode of thin-film transistor 32 is connected to scan line 30, the drain electrode is connected to signal line 20, and the source electrode is connected to pixel electrode 22.

Black matrix 36 for shielding light which has an aperture region (hereinbelow referred to as aperture 34) on the pixel is formed on the surface of second glass substrate 14 that faces first transparent substrate 13, as shown in FIG. 2, and color filter 38 is formed over aperture 34 and over black matrix 36 around the periphery of aperture 34. Aperture 34 is opened in black matrix 36 as a rectangle demarcated by common line 24, scan line 30, and two common electrodes 16, as shown in FIG. 1. Light advances through aperture 34 from the side of first transparent substrate 13 and toward the side of second transparent substrate 15 to realize image display.

Second alignment layer 42 is formed on color filter 38 of second glass substrate 14 with planarization film 40 interposed. The initial direction of orientation of the liquid crystal molecules of second alignment layer 42 is the same direction as that of first alignment layer 28.

Liquid crystal component layer 44 is accommodated and sealed between first alignment layer 26 and second alignment layer 42.

As shown in FIG. 1, liquid crystal molecules are oriented by the aligning function of first alignment layer 26 and second alignment layer 28 such that their director forms any angle θ that is not orthogonal or parallel to the longitudinal direction of pixel electrode 22.

In addition, polarizing sheet (not shown) are provided on the outer sides of first glass substrate 12 and second glass substrate 14. For both polarizing layers, the polarizer absorption axis, which is the direction of the polarizer that absorbs light, is parallel to the rubbing angle, and the analyzer absorption axis, which is direction of an analyzer that absorbs the light, is arranged orthogonal to the rubbing angle, as shown in FIG. 1.

The operation of above-described liquid crystal display 10 of the prior art is next described. Thin-film transistor 32 switches the electrode structure ON and OFF in accordance with ON/OFF signals received from scan line 30. When thin-film transistor 32 is ON, charge flows from signal line 20 to pixel electrode 22. When thin-film transistor 32 is OFF, pixel electrode 22 holds the charge and maintains a particular set potential. In contrast, a constant fixed direct-current voltage is applied to common electrodes 16.

A horizontal electric field is produced within liquid crystal component layer 44 in the direction parallel to first glass substrate 12 due to the difference in electric potential between pixel electrode 22 and common electrodes 16, and the liquid crystal molecules on pixel electrode 22 move. The potential difference between pixel electrode 22 and common electrodes 16 is held until writing of a signal of reversed polarity, and the display written to pixel electrode 22 is therefore displayed by way of aperture 34 of black matrix 36.

The direction of the electric field of common electrodes 16 and the regions of the liquid crystal component layer in the vicinity of common electrodes 16, and accordingly, the regions of the liquid crystal component layer alongside signal lines 20, is not parallel to first glass substrate 12, but rather, is close to perpendicular to glass substrate 12. The optical transmittance therefore cannot be controlled as desired, the luminance is disturbed, and light that passes through this region must be blocked by black matrix 36.

The above-described IPS liquid crystal display of the prior art has the following problems.

First, these liquid crystal displays are prone to a problem called vertical crosstalk in which, when displaying a white window in a black display screen as shown in FIG. 3A, the black display regions above and below the window of the display screen appear faintly white compared to other black display areas when the display screen is viewed from a side.

Second, there is the problem that, in the case of forming the electrodes of first and second transparent substrates by patterning by stepping projection alignment by a stepper, stepping non-uniformity is produced along the borders of the stepping projection alignment, as shown in FIG. 3B.

Regarding the cause of the first problem, as described hereinabove, the proper control of light transmittivity is impossible, i.e., luminance cannot be controlled, in the regions adjacent to signal lines 20, i.e., the regions between signal line 20 and common electrodes 16 (the regions indicated by "g" in FIG. 4, and referred to hereinbelow as "region g"). Moreover, the luminance of these g regions varies with fluctuation in the electric potential of the signal line with respect to the common electrodes and varies with fluctuation in the distance between signal line and common electrodes.

The disadvantage of the vertical crosstalk shown in FIG. 3A arises from the change in electric potential of the signal lines with respect to common electrodes. Signal potential is applied to the signal lines of pixels in which there is white display, and the potential in these signal lines is the average voltage of signal lines and therefore higher than average voltage of the signal lines of pixels in which there is no white display. Luminance thus varies under the influence of this difference in the portions above and below a window when viewed from an angle.

As can be understood from FIG. 4, region g is located exactly behind black matrix 36 and cannot be seen when a user views the display screen from directly in front of the screen, and vertical crosstalk therefore does not occur in the display screen. In contrast, region g is visible when the user views the display screen from an angle, as shown in FIG. 4, and vertical crosstalk therefore occurs in the display screen.

Regarding the cause of the second problem, the disadvantage of the stepping non-uniformity shown in FIG. 3B arises due to the variation in distance between signal lines and common electrodes. The distance between signal lines and common electrodes varies due to aberration in the overlay of the layer in which common electrodes are formed and the layer in which signal lines and pixel electrodes are formed during stepping projection alignment by a stepper.

This variation in distance results in variation in the luminance of region g, which in turn causes stepping non-uniformity when the screen is viewed from an angle.

Two methods have been considered in the prior art for solving the above-described disadvantages of displays:
(1) Enlarging the dimensions of the black matrix such that region g cannot be seen even when the display screen is viewed from an angle; and
(2) overlaying the common electrodes and signal line such that region g does not exist. However, these two methods have the following problems: First, as shown in FIG. 5A, making the dimensions of black matrix 36 on the facing substrate-side equal to or greater than the distance between the outer edges of common electrodes 16A and 16B on the first transparent substrate side in the above-described method (1) hides region g from view even when the display screen is viewed from an angle.

In a case in which the black matrix extends beyond the common electrodes, however, the area of the aperture decreases as shown in FIG. 5A and the aperture ratio decreases. In addition, if a construction is adopted in which the outer edges of black matrix 36 are aligned with the outer edges of common electrodes 16, change or fluctuation in processing conditions causes a divergence in the positions of overlay of first transparent substrate and second transparent substrate. This brings about a corresponding positional shift between black matrix 36 and common electrodes 16 as shown in FIG. 5B, whereby the area of the aperture decreases and the aperture ratio falls.

In the above-described method (2) in which the common electrodes and signal lines are overlapped so as to eliminate region g, parasitic capacitance 46 increases between common electrodes 16 and signal lines 20 as shown in FIG. 6A. This capacitance effect weakens the signal waveform or increases transfer delay and prevents the accurate writing of potential to each pixel.

In addition, the presence of any holes or voids in inter-layer insulation film 18 in the portions of overlap of common electrodes 16 and signal lines 20 as shown in FIG. 6B gives rise to shorts and the increased probability of a defective display device that is incapable of normal display.

As described hereinabove, IPS liquid crystal displays of the prior art were not easily amenable to preventing display defects such as vertical crosstalk and stepping non-uniformity when the display screen is viewed at an angle from the side horizontally.

SUMMARY OF THE INVENTION

It is an object of the present invention to provide an IPS (In-Plane Switching) liquid crystal display that is free of display defects such as vertical crosstalk and stepping non-uniformity even when the display screen is viewed from the side horizontally, that maintains good display uniformity and high aperture ratio, and that has high product yield during fabrication.

A liquid crystal display according to the first invention of this invention includes a first transparent substrate and a second transparent substrate that are arranged to oppose each other, and a liquid crystal component layer sealed between the first transparent substrate and second transparent substrate.

The first transparent substrate is provided with: a transparent insulating substrate, pixel electrodes and common electrodes that are substantially parallel and alternately arranged on the transparent insulating substrate; a plurality of pixels arranged in matrix form; scan lines and switching elements that individually control the electric fields that are applied to the pixel electrodes of the pixels; signal lines connected to the switching elements; common lines that supply a prescribed electric potential to the common electrodes of pixels; and a first alignment layer formed on the highest layer.

The second transparent substrate is provided with at least a second alignment layer formed on the highest layer.

Specific alignment processing is carried out such that the alignment of said first alignment layer and said second alignment layer differs at regions of said signal lines and their vicinities (hereinbelow, referred to simply as "signal line regions") and regions of apertures of said pixels and their vicinities (hereinbelow referred to simply as "pixel aperture regions").

As a preferable embodiment of the first invention, the liquid crystal component has a positive dielectric constant anisotropy, and the alignment process of the signal line regions of the first alignment layer and second alignment layer is carried out in a direction substantially orthogonal to the longitudinal direction of the pixel electrodes. Alternatively, the liquid crystal component has a negative dielectric constant anisotropy, and the alignment process of the signal line regions of the first alignment layer and second alignment layer is carried out in a direction approximately parallel to the longitudinal direction of the pixel electrodes.

According to an embodiment of the first invention, through the use of an alignment layer that has undergone a specific aligning process, the orientation of liquid crystal molecules in the signal line regions of the first alignment layer and second alignment layer is substantially orthogonal to the longitudinal direction of the pixel electrodes, or is substantially parallel to the longitudinal direction of the pixel electrodes. Accordingly, liquid crystal molecules are always in a stationary state with respect to an electric field in the direction orthogonal to the longitudinal direction of the pixel electrodes regardless of the strength of the field. The liquid crystal molecules do not rotate and the transmittivity of light is therefore uniform. The luminance of regions between signal lines and common electrodes, which correspond to the signal line regions (region g in FIG. 4), is therefore a uniform luminance that is not dependent on the rise and fall of the potential of the signal lines with respect to the common electrodes or the amount of distance between the signal lines and common electrodes, and display defects such as vertical crosstalk or stepping non-uniformity therefore do not occur.

According to another preferable embodiment of the first invention, the liquid crystal component layer has a negative dielectric constant anisotropy, and the orientation of the signal line region of the first alignment layer and second alignment layer is oriented perpendicularly. Through the use of alignment layers which have undergone the alignment process specified in this embodiment, the initial orientation of the liquid crystal molecules in the signal line regions is in a direction orthogonal to the substrate, and as a result, liquid crystal molecules are always in a stationary state with respect to an electric field in the direction orthogonal to the longitudinal direction of the pixel electrodes regardless of the strength of the electric field. The liquid crystal molecules do not rotate and the transmittivity of light is therefore uniform. Accordingly, the luminance of the regions between the signal lines and common electrodes (region g in FIG. 4), which correspond to the signal line regions, is therefore a uniform luminance that is not dependent on the rise and fall of the electric potential of the signal lines with respect to the common electrodes or the amount of distance between the signal lines and common electrodes, and display defects such as vertical crosstalk or stepping non-uniformity therefore do not occur.

In the first invention, alignment processing is carried out such that the orientation of the pixel aperture regions has an inclination of any angle θ that is neither parallel nor orthogonal to the longitudinal direction of the pixel electrodes. In this way, the angle θ formed by the longitudinal direction of the electrode and the rubbing direction can be any angle other than 0° and 90°, depending on the setting of optical characteristics of the liquid crystal display.

The alignment processing of regions other than the signal line regions and pixel aperture regions may be the same as the alignment processing of the signal line regions or pixel aperture regions.

Any method of alignment processing of the first alignment layer and second alignment layer may be used in the first invention. For example, the first alignment layer and the second alignment layer may be alignment layers that have undergone rubbing such that the alignment layer of the signal line regions and pixel aperture regions undergo the stipulated alignment process; or may be alignment layers capable of light orientation that have undergone a polarized light irradiation process such that the alignment layer in the signal line regions and pixel aperture regions undergo the stipulated alignment process.

A liquid crystal display according to the second invention of this invention includes a first transparent substrate and a second transparent substrate arranged to oppose each other, and a liquid crystal component layer sealed between the first transparent substrate and the second transparent substrate.

The first transparent substrate is provided with: a transparent insulating substrate, pixel electrodes and common electrodes that are substantially parallel and alternately arranged on the transparent insulating substrate; a plurality of pixels arranged in matrix form; scan lines and switching elements that individually control the electric fields that are applied to the pixel electrodes of the pixels; signal lines connected to the switching elements; common lines that supply a prescribed electric potential to the common electrodes of the pixels; and a first alignment layer formed on the highest layer.

The second transparent substrate is provided with at least a second alignment layer, which is the highest layer; and a light-shielding layer under the second alignment layer having pixel aperture regions.

The liquid crystal component has a positive dielectric constant anisotropy, and the first alignment layer and second alignment layer undergo an alignment process so as to have an inclination of any angle θ which is neither parallel nor orthogonal to the longitudinal direction of the pixel electrodes. The light shielding layer is composed of a conductor, and voltage is applied to the light-shielding layer such that the director of the liquid crystal molecules within the liquid crystal component layer in the regions of the signal lines and their vicinities (hereinbelow referred to as simply "signal line regions") is aligned substantially perpendicular to the first transparent substrate.

In a preferable embodiment of the second invention, the voltage impressed to the light-shielding layer is a direct-current voltage having a potential within a range 10–20 V higher than, or within a range of 10–20 V lower than, the average value of the potential of the signal lines, or is an alternating voltage having a long period.

In the second invention, the director of the liquid crystal molecules is aligned substantially perpendicular to the first transparent substrate in the region (region g in FIG. 4) between the signal lines and common electrodes, which corresponds to the signal line region, and the transmittivity of light is therefore uniform regardless of the strength of the electric field between the common electrodes and pixel electrodes. As a result, the luminance of the signal line regions is uniform and not dependent on the rise and fall of electric potential of the signal lines with respect to the common electrodes or the amount of distance between the signal lines and the common electrodes, and display defects such as vertical crosstalk or stepping non-uniformity do not occur.

The angle θ formed by the longitudinal direction of the electrodes and the rubbing direction depends on the setting of optical characteristics of the liquid crystal display and can be any angle other than 0° and 90°.

In the first invention and second invention, the arrangement of such components as the pixel electrodes, signal lines, and common electrodes is open to variation, and for example, the pixel electrodes and signal lines may both be parallel to the common electrodes with an interposed insulating layer and extend at a distance from each other. In addition, the common electrodes and pixel electrodes may extend parallel and at a distance from each other, and the signal lines may extend parallel to the common electrodes with an interposed insulating layer.

The above and other objects, features, and advantages of the present invention will become apparent from the following description based on the accompanying drawings which illustrate examples of preferred embodiments of the present invention.

DETAILED DESCRIPTION OF THE PREFERRED EMBODIMENTS

Embodiments of the present invention are next explained concretely and in detail with reference to the figures and embodiments.

Figure 1:
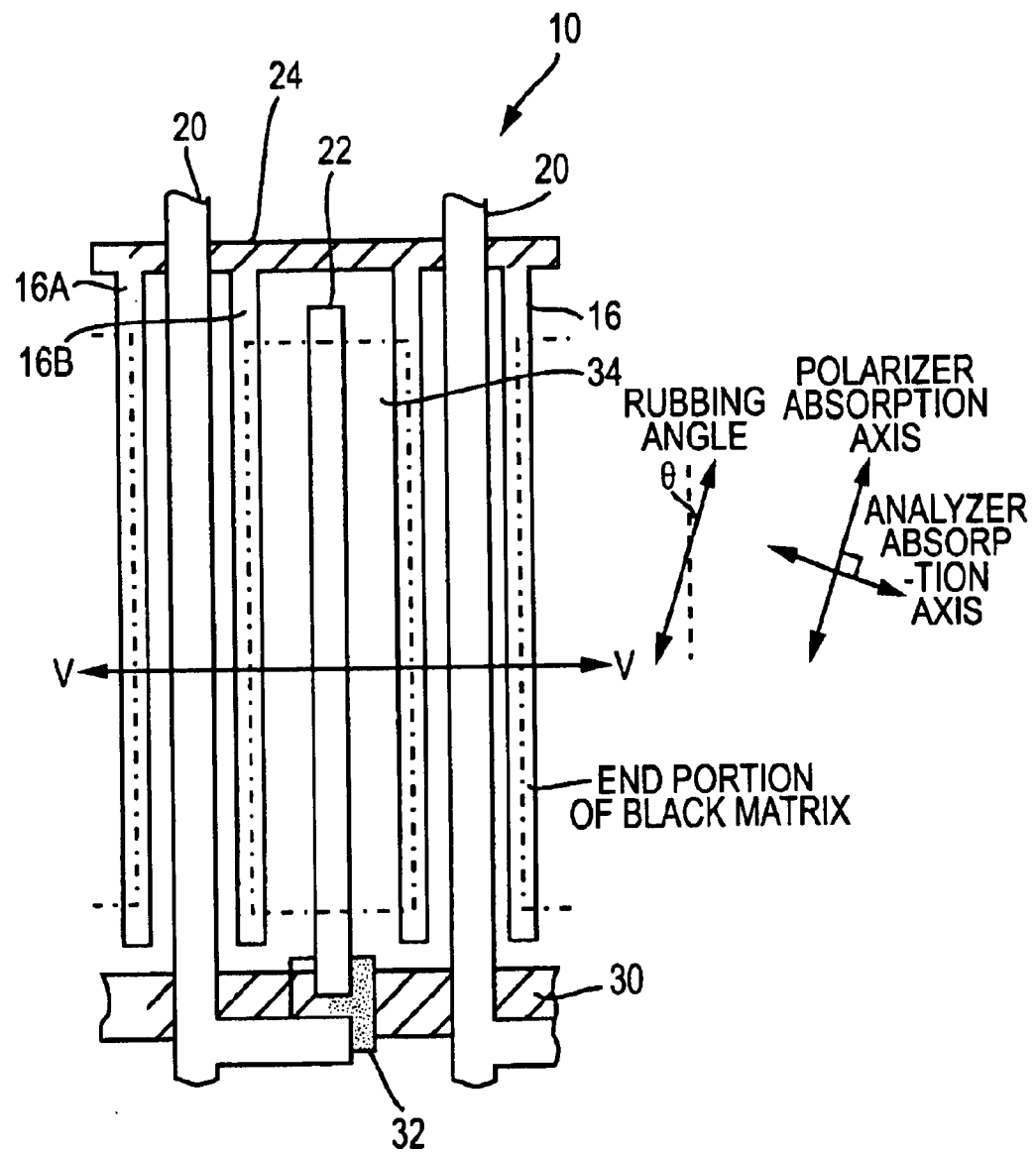
FIG. 1 is a plan view showing the construction of one pixel of a liquid crystal display of the prior art.
Figure 2:
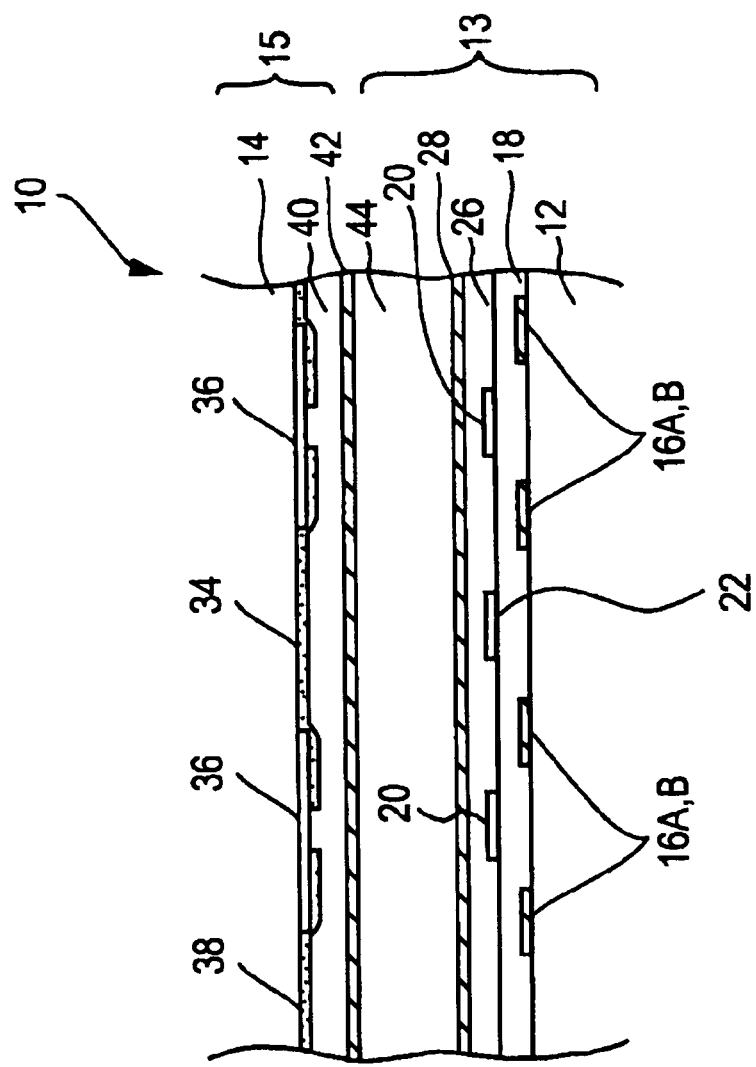
FIG. 2 is a sectional view taken at line V—V of the liquid crystal display shown in FIG. 1.
Figures 3A, 3B:
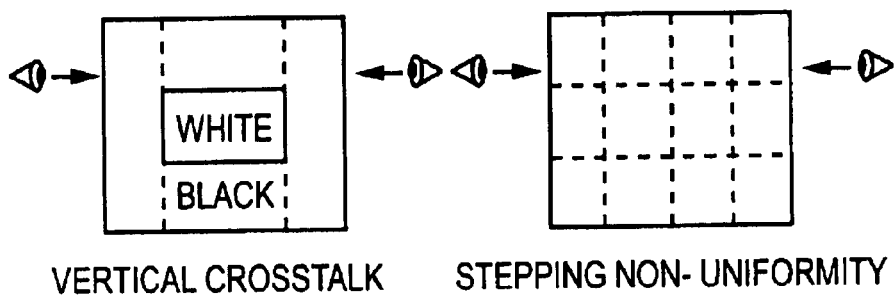
FIG. 3A is a schematic view showing vertical crosstalk, which is a display defect.
FIG. 3B is a schematic view showing stepping non-uniformity, which is a display defect.

The first embodiment of the first invention of the present invention is described with reference to FIG. 7 to FIG. 10. Liquid crystal display 50 according to the first embodiment of the first invention is a liquid crystal display generally described as the horizontal-field-drive type (hereinbelow referred to simply as "IPS liquid crystal display" or merely, "liquid crystal display"). This embodiment has basically the same structure as IPS liquid crystal display 10 described as the prior art with reference to FIG. 1 and FIG. 2 with the exception of the rubbing angle of first alignment layer 51 and second alignment layer 53, and accordingly, the initial direction of orientation of the liquid crystal molecules within the liquid crystal component layer. Parts that are identical to those of the prior art are therefore identified by the same reference numerals.

Figure 8:
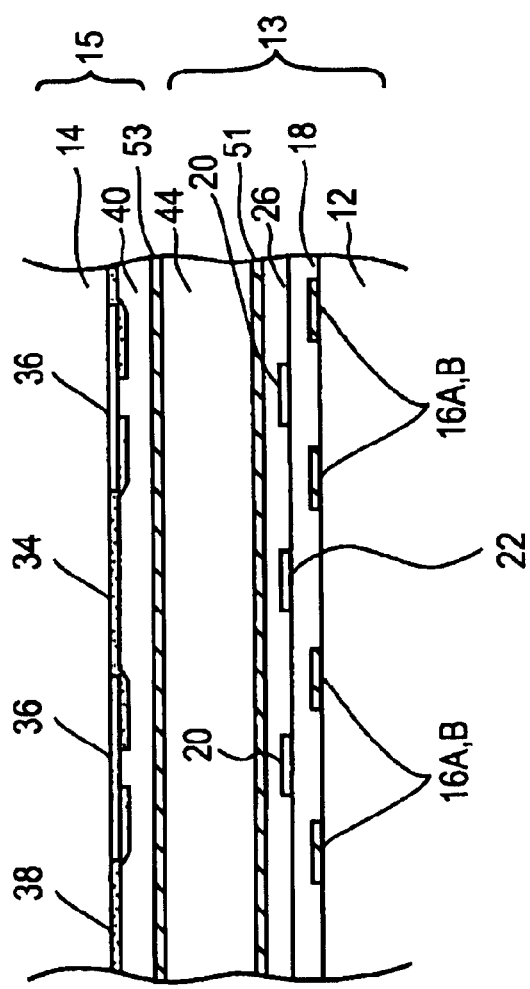
FIG. 8 is a sectional view at line I—I of FIG. 7.

Liquid crystal display 50 includes a plurality of pixels arranged in a matrix form and is provided with first transparent substrate (TFT substrate) 13, second transparent substrate (facing substrate) 15, and liquid crystal component layer 44 sealed between first transparent substrate 13 and second transparent substrate 15, as shown in FIG. 8.

First transparent substrate 13 is provided with first glass substrate 12 that includes electrodes (16, 20, 22) and switching structures (30, 32), and first alignment layer 51. Second transparent substrate 15 is provided with light-shielding layer 36 and second alignment layer 53 formed in succession on second glass substrate 14. Second transparent substrate 15 is arranged such that second alignment layer 53 is parallel to and confronting first alignment layer 51 of first transparent substrate 13.

Figure 7:
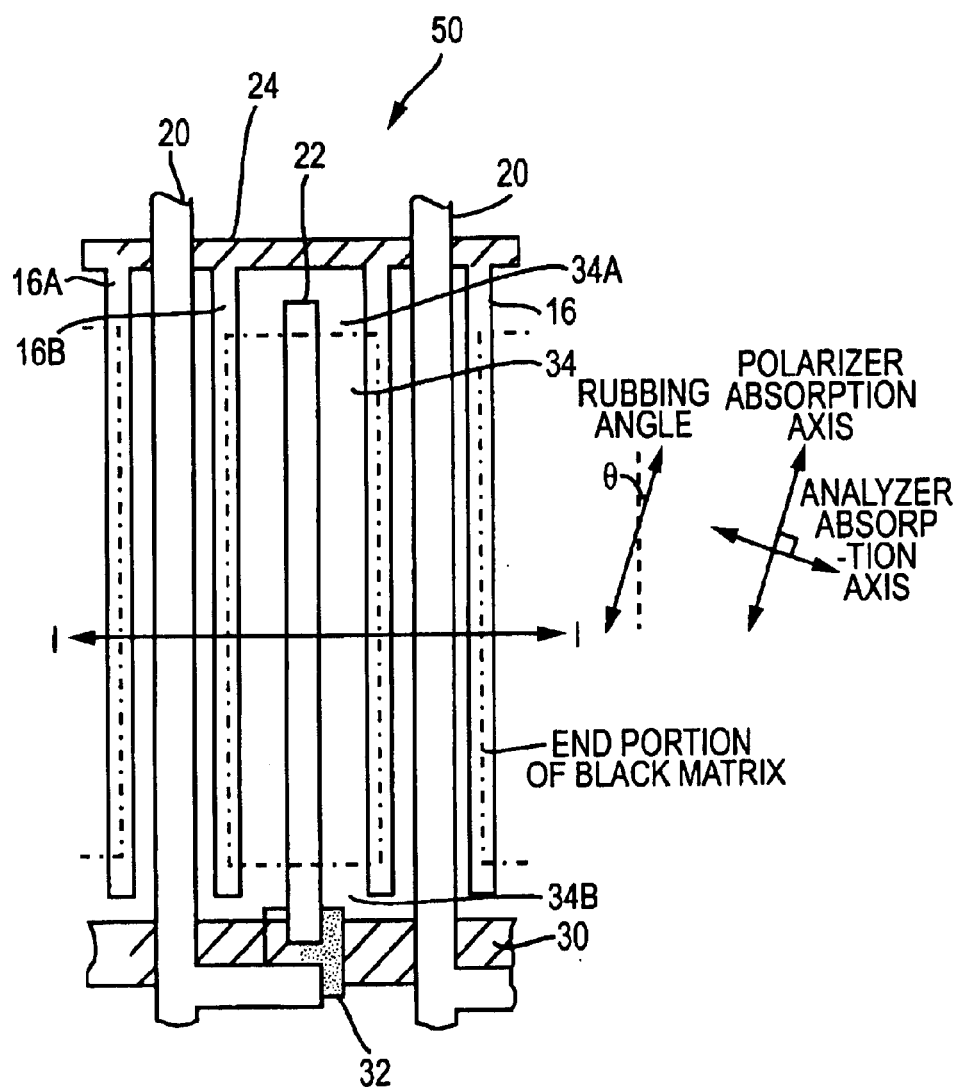
FIG. 7 is a plan view showing the construction of one pixel in the liquid crystal display according to the first embodiment of the first invention of the present invention.

As shown in FIG. 7, the electrodes (16, 20, 22) for each pixel are made up of two common electrodes 16A and 16B that extend parallel and separated from each other on first glass substrate 12; first insulating film 18 formed over common electrodes 16; signal line (drain line) 20 that extends parallel to common electrodes 16 and arranged over first insulating film 18 between common electrode 16B of one pixel and common electrode 16A of the adjacent pixel; and pixel electrode 22 that similarly extends parallel to common electrodes 16 and arranged over first insulating film 18 and between common electrode 16A and common electrode 16B. Common electrode 16A and common electrode 16B are each connected to common line 24. Pixel electrode 22 and common electrodes 16 are actually arranged to form a plurality of alternately arranged pairs.

Switching mechanism (30, 32) is made up of thin-film transistor 32 and scan line 30 for driving thin-film transistor 32, the gate electrode of thin-film transistor 32 being connected to scan line 30, the drain electrode being connected to signal line 20, and the source electrode being connected to pixel electrode 22.

First alignment layer 51 is stacked on first glass substrate 12 over signal lines 20 and pixel electrodes 22 with an interposed second insulating film 26.

Black matrix 36 for blocking light and including pixel aperture region 34 (hereinbelow referred to as "aperture 34") is formed on the surface of second glass substrate 14 that faces first transparent substrate 13, as shown in FIG. 8, and color filter 38 is formed over aperture 34 and over black matrix 36 around the periphery of aperture 34. Aperture 34 is opened in black matrix 36 as a rectangle demarcated by common line 24, scan line 30, and two common electrodes 16, as shown in FIG. 7. Light passes through aperture 34 from first transparent substrate 13 toward second transparent substrate 15 to realize image display.

Liquid crystal component layer 44 is accommodated and sealed between first alignment layer 51 and second alignment layer 53.

Figure 9:
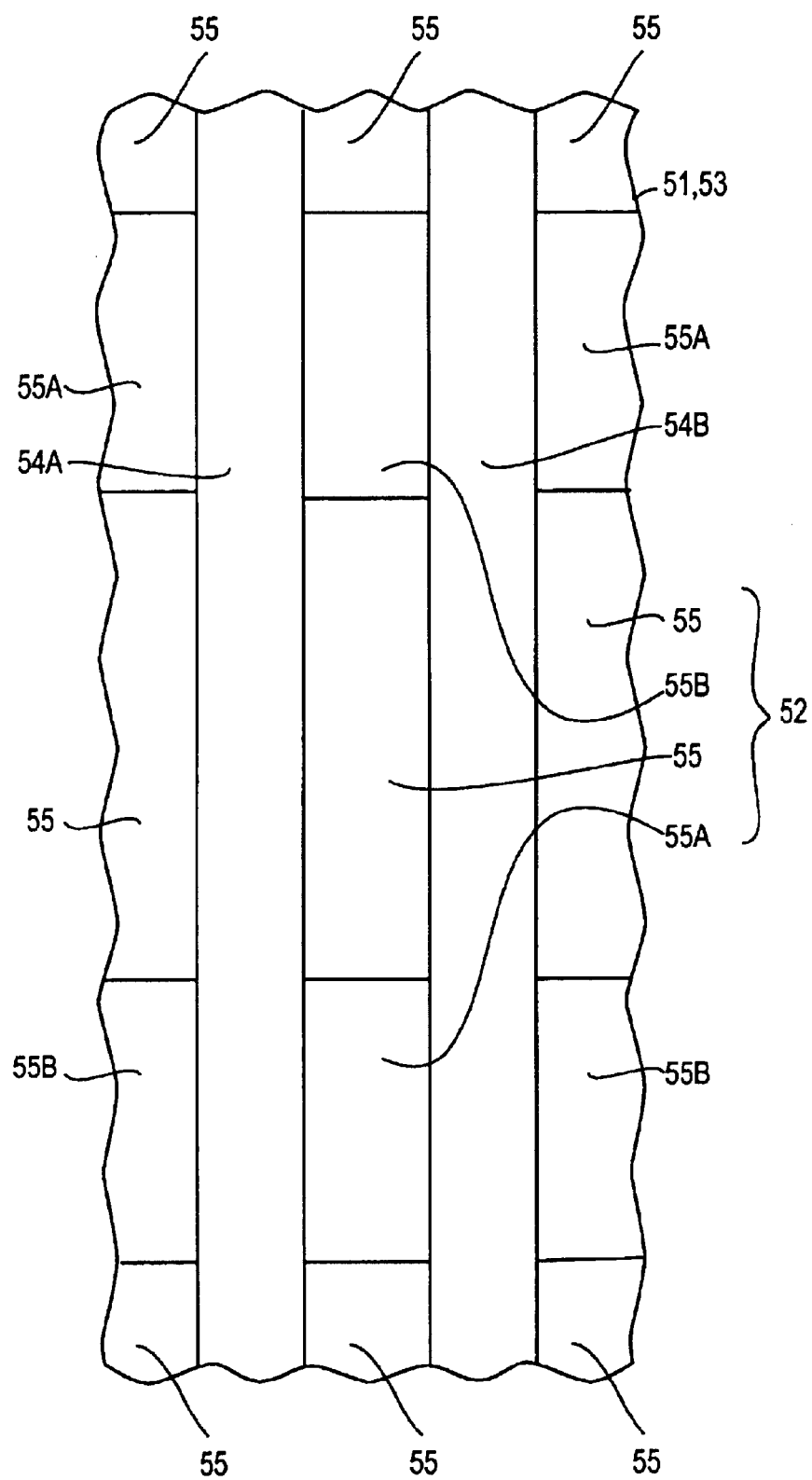
FIG. 9 is a schematic plan view showing the partition of first alignment layer and second alignment layer.

In this embodiment, first alignment layer 51 and second alignment layer 53 are partitioned into strip region 52 that includes the region corresponding to aperture 34, and region 54A and region 54B at the two sides of region 52, as shown in FIG. 9. Region 52 and region 54A and 54B on both sides of region 52 are characterized by having different directions of initial orientation of the liquid crystal molecules in the alignment layer.

Region 52 is made up of three regions: region 55 corresponding to the aperture 34 shown in FIG. 7, and regions 55A and 55B that correspond to extensions 34A and 34B, respectively, that extend outward in the longitudinal direction from both ends of aperture 34.

Figure 4:
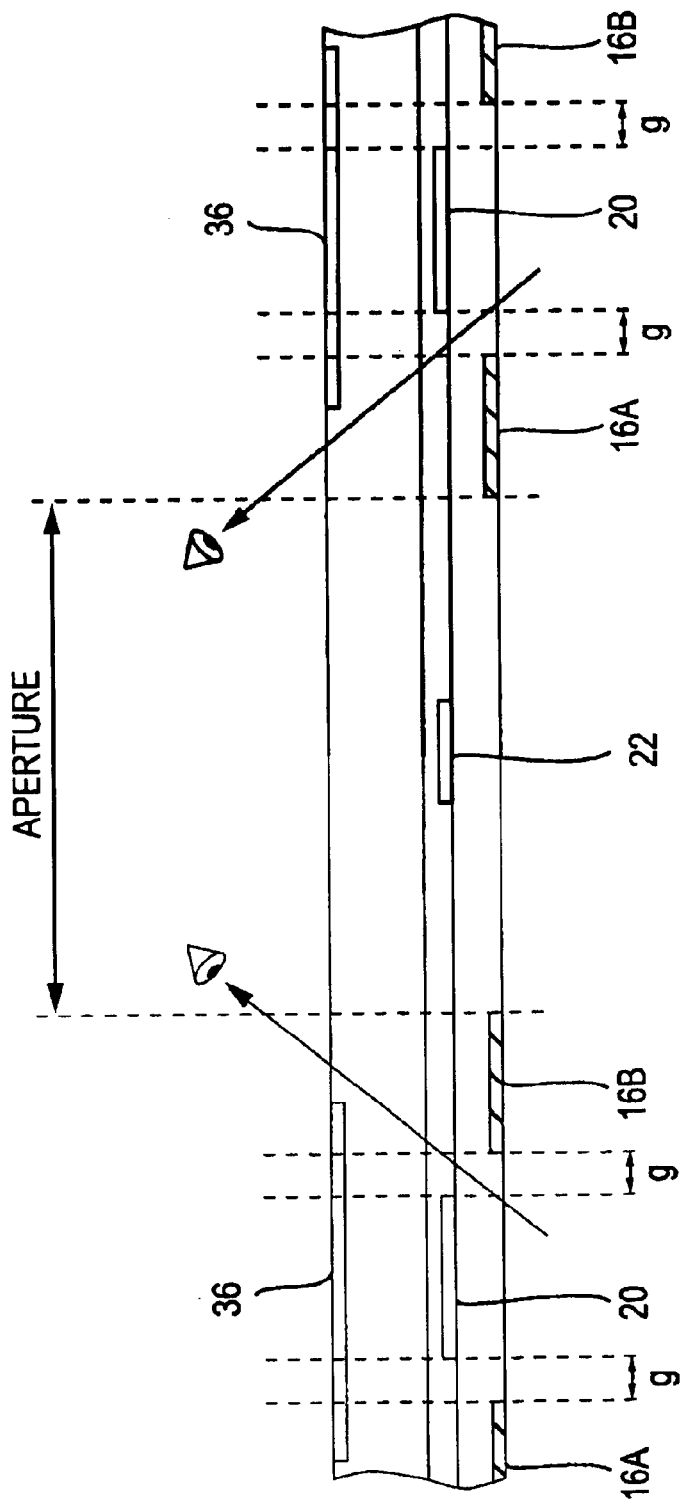
FIG. 4 is a sectional view of a pixel for illustrating the cause of the display defect shown in FIG. 3.

Region 55 of region 52 accordingly lies in first alignment layer 51 and second alignment layer 53 below aperture 34 of black matrix 36. Region 55A and region 55B of region 52 as well as region 54A and region 54B on both sides of region 52 all lie below the regions of black matrix 36 apart from aperture 34. The regions between signal line 20 and common electrodes 16 (region g in FIG. 4 of the prior-art example) are included within region 54A and region 54B.

Figure 10:
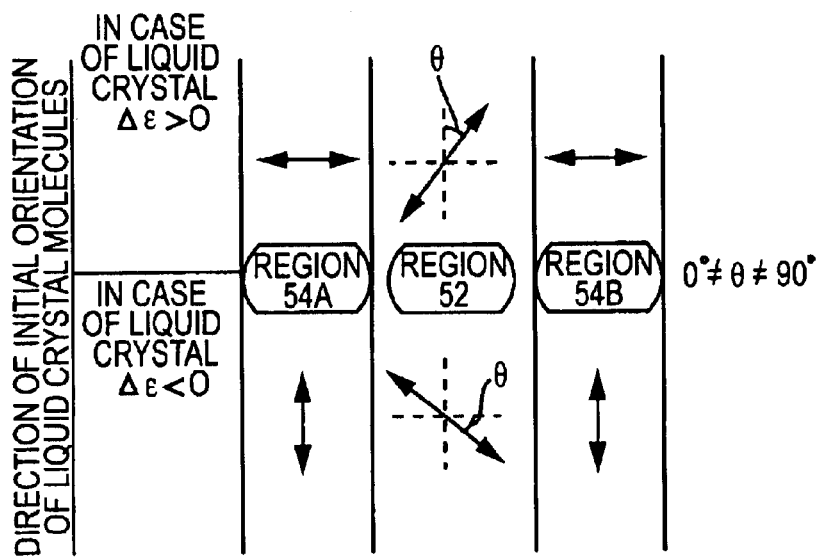
FIG. 10 is a schematic view showing the initial direction of alignment of liquid crystal molecules of an alignment layer in each partition shown in FIG. 9.

First alignment layer 51 and second alignment layer 53 are alignment layers that have been processed such that, when the dielectric constant anisotropy $\Delta \in$ of the liquid crystal molecules of liquid crystal component layer 44 is greater than 0, the direction of initial orientation of liquid crystal molecules in region 52 have an inclination of θ° with respect to the longitudinal direction of pixel electrode 22 within a plane that is parallel to first glass substrate 12, as shown in FIG. 10. In other words, the rubbing angle of the alignment layer of region 52 is θ, and the direction of initial orientation of liquid crystal molecules has an inclination of θ° with respect to the longitudinal direction of pixel electrode 22 within a plane that is parallel to first glass substrate 12. In addition, first alignment layer 51 and second alignment layer 53 are alignment layers that have been processed such that when the dielectric constant anisotropy $\Delta\in$ of liquid crystal molecules is less than 0, the direction of initial orientation of liquid crystal molecules in region 52 has an inclination of θ° with respect to the direction that is orthogonal to the longitudinal direction of pixel electrode 22 within a plane parallel to first glass substrate 12. In other words, the rubbing angle of the alignment layers of region 52 is θ°, and the direction of initial orientation of liquid crystal molecules has an inclination of θ° with respect to the direction that is orthogonal to the longitudinal direction of pixel electrode 22 in a plane parallel to first glass substrate 12.

The angle θ can be any angle other than 0° and 90° depending on the setting of optical characteristics of the liquid crystal display.

In region 54A and region 54B on both sides of region 52, on the other hand, first alignment layer 51 and second alignment layer 53 are alignment layers that have been processed such that the direction of initial orientation of the liquid crystal molecules is orthogonal to the longitudinal direction of pixel electrode 22 within a plane that is parallel to first glass substrate 12 when the dielectric constant anisotropy $\Delta\in$ of the liquid crystal molecules of liquid crystal component layer 44 is greater than 0 as shown in FIG. 10, and such that the direction of initial orientation of liquid crystal molecules is parallel to the longitudinal direction of pixel electrode 22 within a plane that is parallel to first glass substrate 12 when the dielectric constant anisotropy $\Delta\in$ of the liquid crystal molecules is less than 0.

In region 54A and region 54B, therefore, the direction of initial orientation of the liquid crystal molecules of liquid crystal component layer 44 is orthogonal to the longitudinal direction of pixel electrode 22 when dielectric constant anisotropy $\Delta\in$ of the liquid crystal molecules is greater than 0, and the direction of initial orientation of the liquid crystal molecules of liquid crystal component layer 44 is parallel to the longitudinal direction of pixel electrode 22 when the dielectric constant anisotropy $\Delta\in$ of the liquid crystal molecules is less than 0.

In addition, the electric potential of black matrix 36 is preferably floating when the dielectric constant anisotropy of the liquid crystal molecules is positive, while any potential can be given when the dielectric constant anisotropy is negative.

Figure 11:
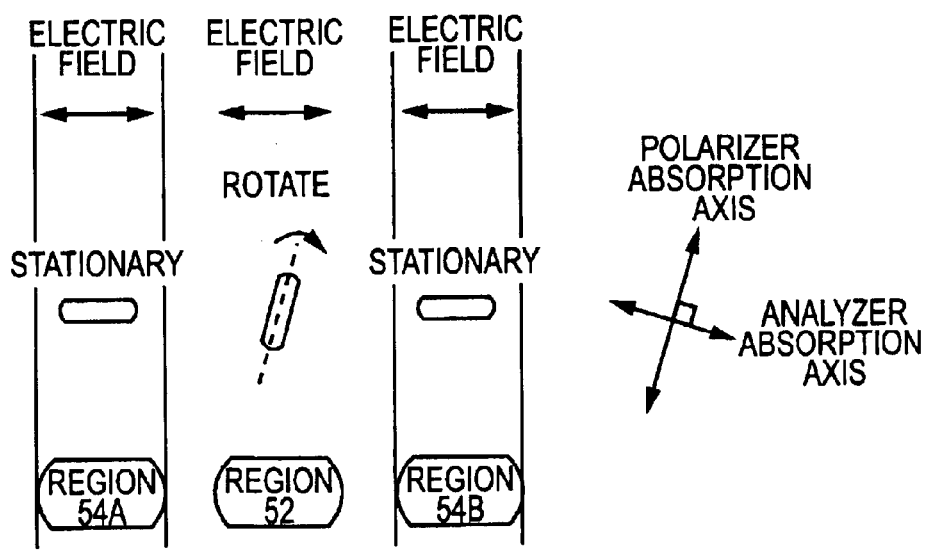
FIG. 11 is a schematic view showing the initial direction of alignment of a liquid crystal of the first embodiment.

The action of liquid crystal display 50 of this embodiment is next described with reference to FIG. 11 for a case in which the dielectric constant anisotropy $\Delta\in$ of the liquid crystal molecules is greater than 0. In a region that includes region 54A and region 54B, i.e., regions alongside the signal line (region g in FIG. 4), the direction of initial orientation of the liquid crystal molecules is perpendicular to pixel electrodes 22, and accordingly, to signal lines 20. As a result, the liquid crystal molecules remain constantly stationary regardless of the strength of the electric field in the direction orthogonal to signal line 20, and the transmittivity of light is therefore uniform. In region 52, on the other hand, the liquid crystal molecules rotate according to the strength of the electric field, and the transmittivity of light is controlled.

Figure 12:
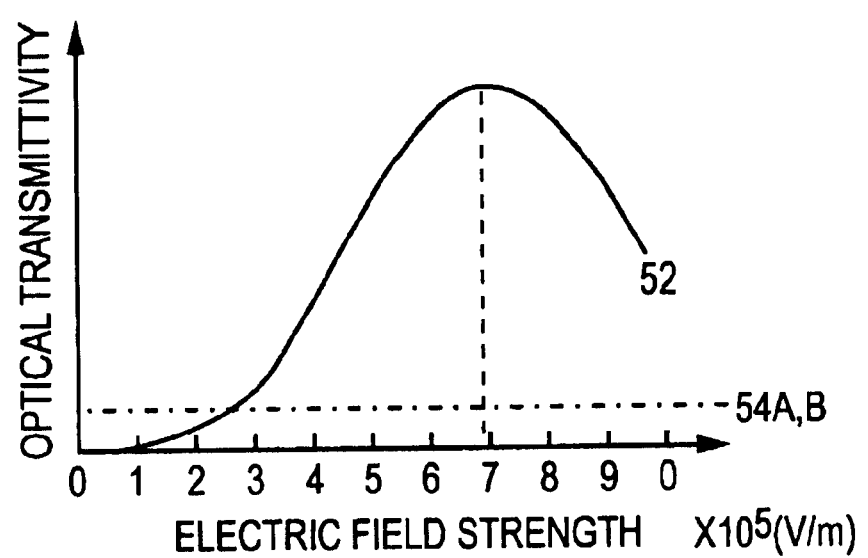
FIG. 12 is a graph regarding a liquid crystal display according to the first embodiment and shows the relation between the electric field intensity between common electrodes and pixel electrodes and the optical transmittivity (%) when the amount of light emitted from the sheet polarizer on the side of the first glass substrate is 100.

FIG. 12 is a graph showing the relation between the electric field strength between common electrodes 16 and pixel electrode 22 and the optical transmittivity (%) of liquid crystal display 50 when the quantity of light emitted from a polarizing sheet on first glass substrate 12 is 100. In region 52, the optical transmittivity of the liquid crystal increases as the strength of the electric field increases. In region 54A and region 54B, on the other hand, the liquid crystal does not move despite increased strength of the electric field, and the optical transmittivity is therefore uniform. The luminance of regions along the signal lines is therefore uniform regardless of the rise and fall of potential of the signal lines with respect to the common electrodes or amount of space between signal lines and common electrodes.

As a result, display defects such as vertical crosstalk and stepping non-uniformity that were present when observing the display surface of a prior-art IPS liquid crystal display from an angle are not present in liquid crystal display 50 of this embodiment, and the display quality is improved.

The method of fabricating liquid crystal display 50 of the first embodiment of the first invention is next explained.

Figure 13A:
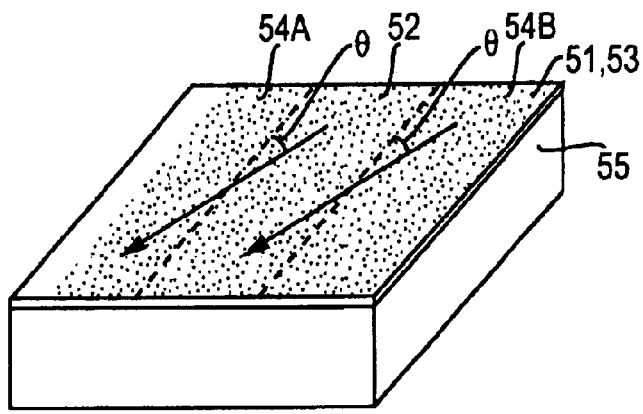
FIG. 13A is a schematic perspective view showing the first step in the process of fabricating a liquid crystal display of the first embodiment.
Figure 13B:
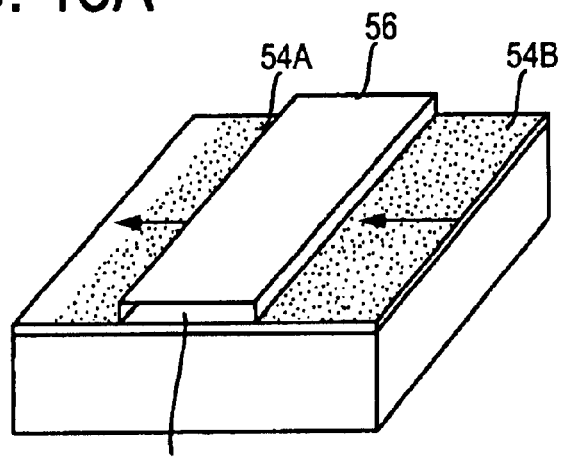
FIG. 13B is a schematic perspective view showing the second step in the process of fabricating a liquid crystal display of the first embodiment.

A first method of fabricating liquid crystal display 50 having liquid crystal molecules in which dielectric constant anisotropy $\Delta\in$ is greater than 0 is next described with reference to FIGS. 13A–13C.

(1) First, alignment layers having a pretilt angle of 5° or less are used as first alignment layer 51 and second alignment layer 53. Next, as shown in FIG. 13A, the entire surface of the alignment layers, i.e., all of region 52, region 54A and region 54B, undergo rubbing so as to acquire the direction of initial orientation θ of region 52. The angle θ can be any angle other than 0° and 90°, depending on the set optical characteristics of the liquid crystal display. This is also true of the second embodiment and the embodiment of the second invention described hereinbelow.

(2) Next, a photoresist film is applied to the entire surface of the alignment layers, following which patterning is carried out by photolithography and wet etching to leave photoresist film 56 on only region 52 and thereby mask region 52. Next, as shown in FIG. 13B, the alignment layers of region 54A and region 54B undergo a rubbing process such that the direction of orientation of the liquid crystal molecules of region 54A and 54B is orthogonal to the longitudinal direction of pixel electrode 22. The photoresist film may be either posi-resist or nega-resist, and as an example, OFPR-800C of Tokyo Applications (KK) may be used as the photoresist film and trimethylamine may be used as the developer.

Figure 13C:
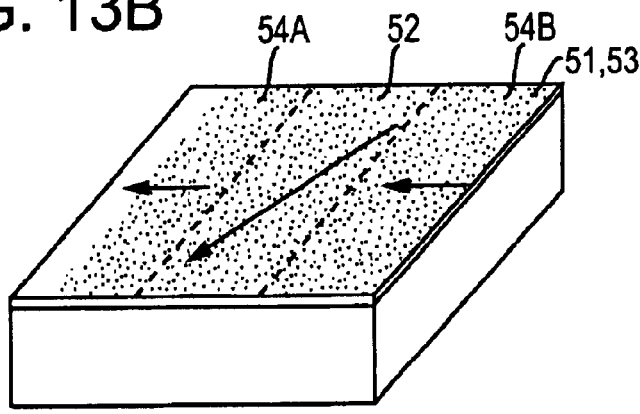
FIG. 13C is a schematic perspective view showing the third step in the process of fabricating a liquid crystal display of the first embodiment.

(3) Finally, as shown in FIG. 13C, the desired first alignment layer 51 and second alignment layer 53 can be obtained by stripping off photoresist film 56 on region 52 using a stripper, and then washing in water at room temperature. ethyl lactate, dimethylsulfoxide, or mono ethanolamine may be used as the resist stripper.

A second method of fabricating liquid crystal display 50 having liquid crystal molecules in which dielectric constant anisotropy $\Delta\in$ is greater than 0 is next described with reference to FIGS. 14A and 14B.

(1) In this method, alignment layers that can align light are used as first alignment layer 51 and second alignment layer 53. As an alignment layer that can align light, an alignment layer may be used that is composed of a polymer such as a photosensitive radical polymerized by a polarized light irradiation described in the AM-LCD '96/IDW '96 Digest of Technical Papers (p. 337).

Figure 14A:
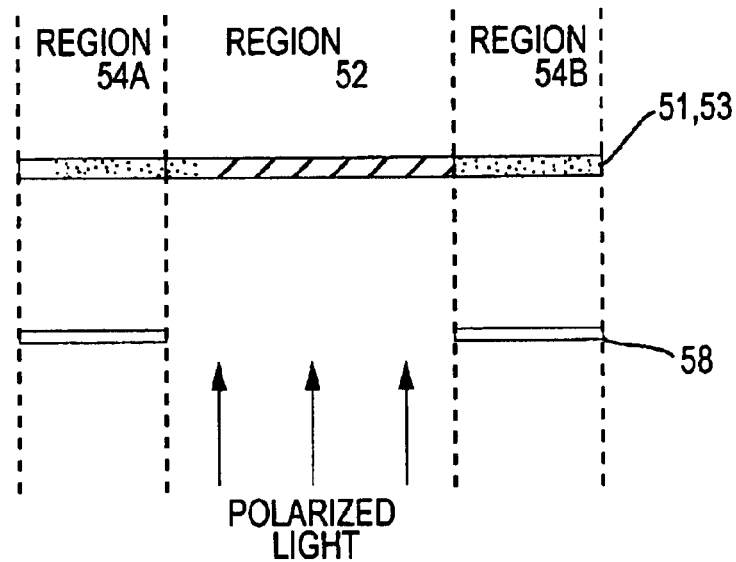
FIG. 14A is a schematic perspective view showing the first step in the another fabrication process of a liquid crystal display of the first embodiment.
Figure 14B:
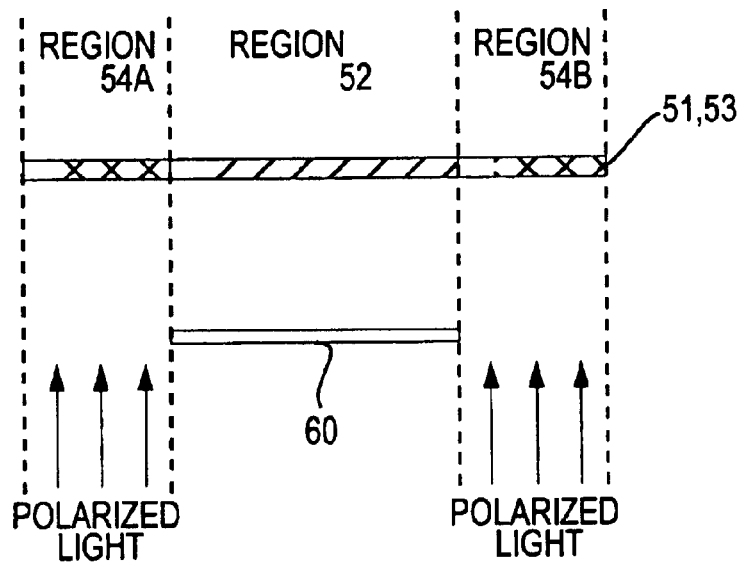
FIG. 14B is a schematic perspective view showing the second step in the another fabrication process of a liquid crystal display of the first embodiment.

An alignment layer is first applied to substrate 55, following which regions 54A and 54B are covered by a mask 58 as shown in FIG. 14A, and region 52 is irradiated by polarized light having an angle θ with respect to the longitudinal direction of common electrodes 16. The direction of initial orientation of liquid crystal molecules in region 52 is thus θ° with respect to the longitudinal direction of common electrodes 16.

(2) Next, region 52 is covered by another mask 60, and region 54A and region 54B are irradiated by polarized light such that the direction of initial orientation of the liquid crystal molecules of region 54A and region 54B is in the direction orthogonal to the longitudinal direction of pixel electrode 22, and accordingly, of signal line 20, thereby obtaining the desired first alignment layer 51 and second alignment layer 53.

Figure 15:
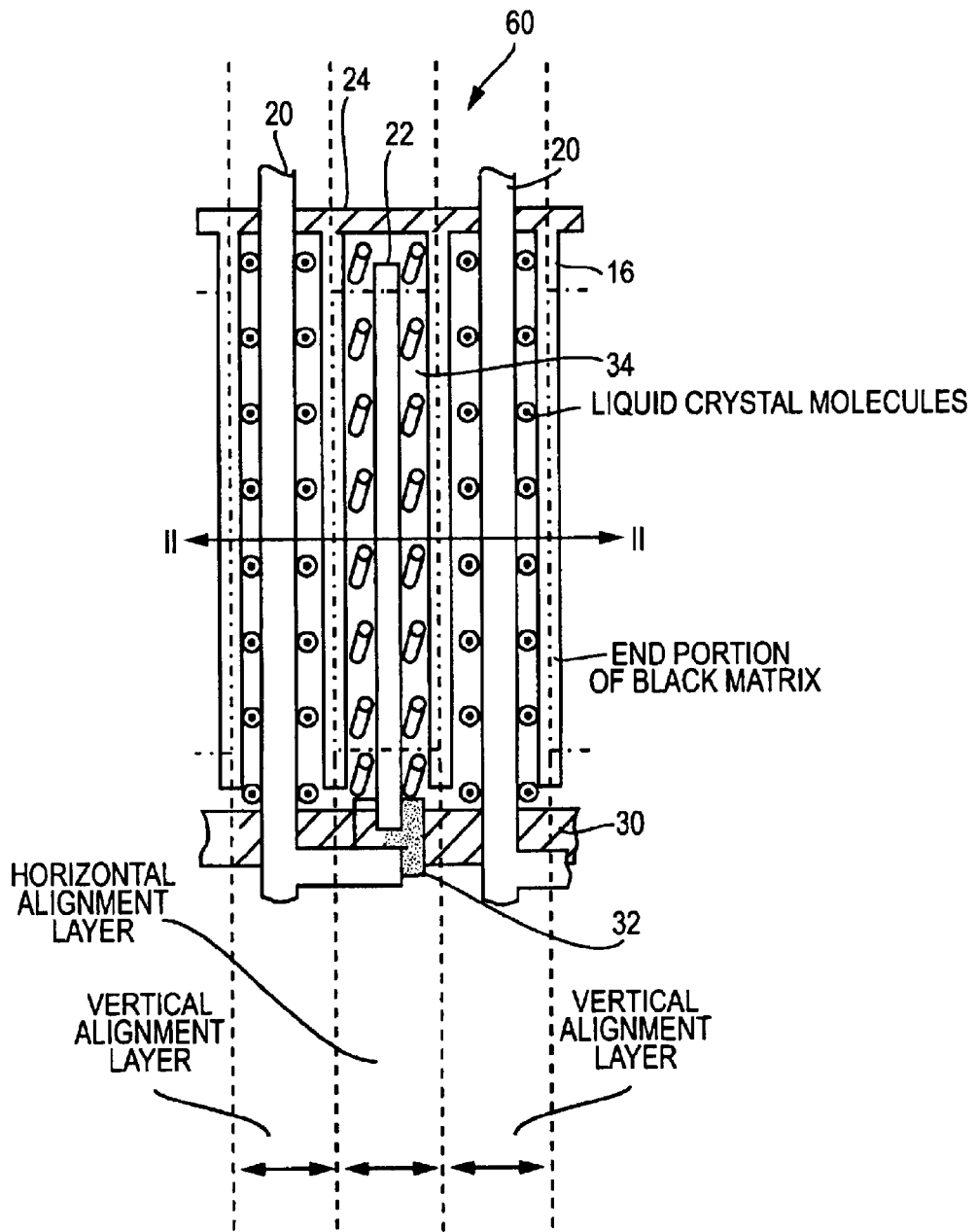
FIG. 15 is a plan view showing the construction of one pixel of the liquid crystal display according to the second embodiment of the first invention of the present invention.
Figure 16:
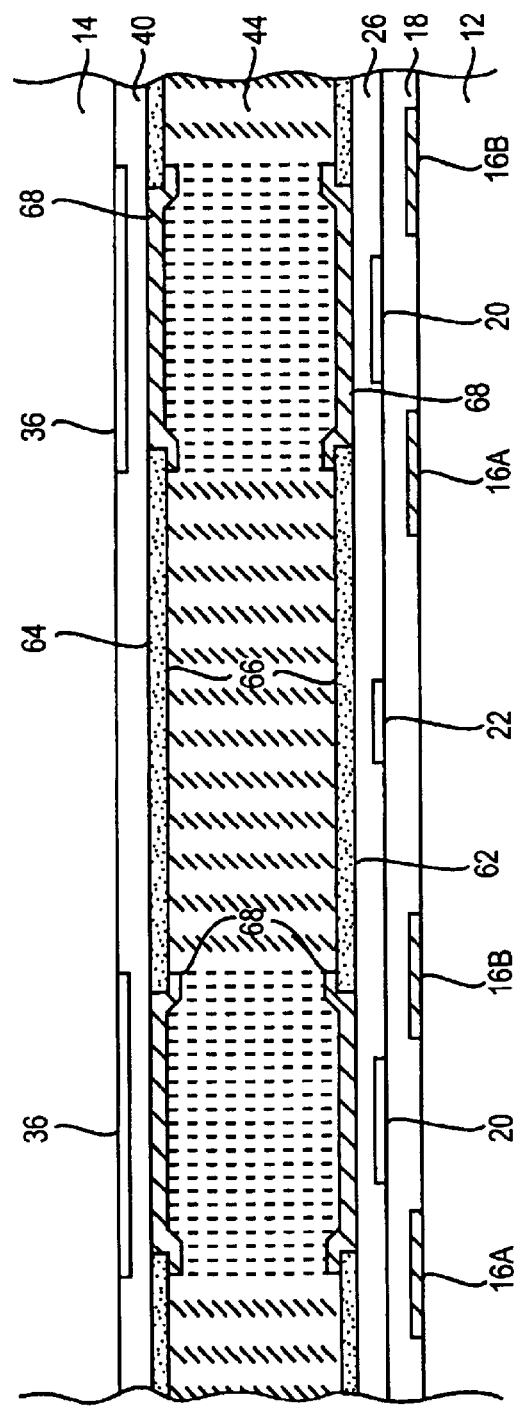
FIG. 16 is a sectional view at line II—II of the liquid crystal display shown in FIG. 15.

Explanation is next presented with reference to FIG. 15 and FIG. 16 regarding the second embodiment of the first invention of the present invention. In liquid crystal display 60 according to the second embodiment of the first invention, the structure of first alignment layer 62 and second alignment layer 64 are changed, the direction of initial orientation of liquid crystal molecules within the liquid crystal component layer is accordingly different, and the dielectric constant anisotropy $\Delta \in$ of liquid crystal molecules is limited to a negative value. With the exception of these differences, this embodiment, like the first embodiment, is basically an IPS liquid crystal display having an architecture similar to liquid crystal display 10 described as the prior-art example with reference to FIG. 1 and FIG. 2. Components that are identical to those of the prior-art example are therefore identified by the same reference numerals.

As shown in FIG. 16, first alignment layer 62 is stacked over signal lines 20 and pixel electrodes 22 on the side of first glass substrate 12, with second insulating film 26 interposed. As first alignment layer 62, horizontal alignment layer 66 is used in region 52, and vertical alignment layer 68 is used in region 54A and region 54B, i.e., in the regions including the region along the signal lines 20 below black matrix 36 (region g in FIG. 4).

Second alignment layer 64, on the other hand, is formed on the surface of second glass substrate 14 that faces first glass substrate 12 with interposed planarization film 40. As with first alignment layer 62, horizontal alignment layer 66 is used as second alignment layer 64 in region 52, and vertical alignment layer 68 is used as second alignment layer 64 in region 54A and region 54B, i.e., the regions that include the regions alongside signal line 20 below black matrix 36 (region g in FIG. 4). Vertical alignment layer 68 is an alignment layer having the function of orienting liquid crystal molecules within liquid crystal component layer 44 in a direction orthogonal to alignment layer 68.

A liquid crystal is used in which the dielectric constant anisotropy $\Delta \in$ of the liquid crystal molecules is negative.

Horizontal alignment layer 66 is an alignment layer treated such that the direction of initial orientation of the director of liquid crystal molecules has an inclination of angle θ with respect to the longitudinal direction of pixel electrodes 22 in a horizontal plane, or in other words, has a rubbing angle of θ.

Liquid crystal component layer 44 is accommodated between first alignment layer 62 and second alignment layer 64.

In this embodiment, therefore, the direction of initial orientation of the liquid crystal molecules of liquid crystal component layer 44 has an inclination of θ with respect to the longitudinal direction of pixel electrode 22 and is oriented parallel to first glass substrate 12 and second glass substrate 14 in region 52, and is oriented orthogonal to region 54A and region 54B, as shown in FIG. 15 and FIG. 16.

In addition, the electric potential of black matrix 36 is floating.

Figure 17:
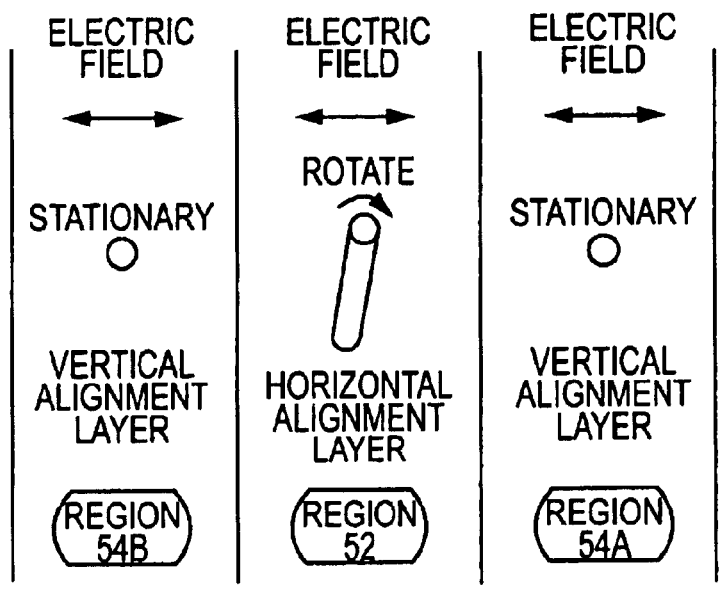
FIG. 17 is a schematic view showing the initial direction of alignment of the liquid crystal of the second embodiment.

In liquid crystal display 60 of this embodiment, vertical alignment layer 68 is provided as the alignment layer in region 54A and region 54B, and the liquid crystal molecules are therefore oriented vertically as shown in FIG. 17. The movement of liquid crystal molecules is therefore suppressed by the normal electric field strength of the liquid crystal display, and because light is unaffected by double refraction, light is not transmitted in region 54A and region 54B. In region 52 where horizontal alignment layer 66 is provided as the alignment layer, in contrast, the liquid crystal molecules rotate according to the strength of the electric field and the transmittivity of light therefore varies with the electric field strength.

Figure 18:
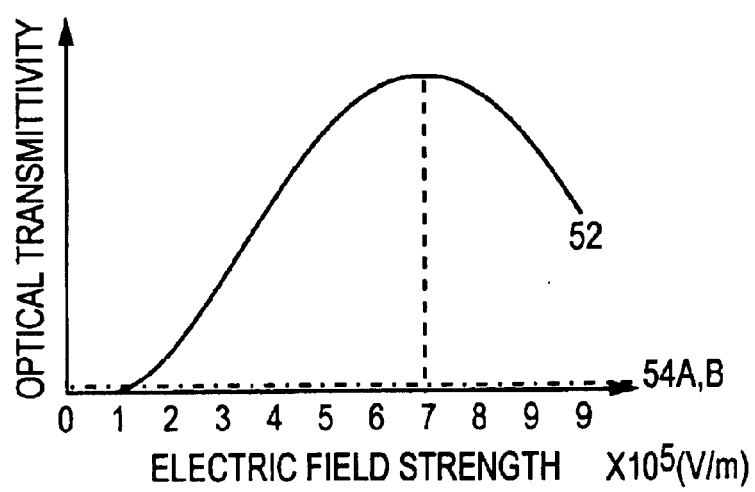
FIG. 18 is a graph regarding a liquid crystal display according to the second embodiment and shows the relation between the electric field intensity between common electrodes and pixel electrodes and the optical transmittivity (%) when the amount of light emitted from the sheet polarizer on the side of the first glass substrate is 100.

As shown in FIG. 18 and similar to FIG. 12, transmittivity changes with field strength in region 52 and thus operates normally as a display device. In region 54A and region 54B, in contrast, almost no light is transmitted despite changes in the degree of the electric field. In other words, the luminance in regions alongside the signal lines (region g in FIG. 4) is fixed (nearly black) regardless of the signal line potential or the amount of space between the signal lines and common electrodes. Due to these factors, the vertical crosstalk or stepping non-uniformity that were visible when viewed from an angle in liquid crystal display 10 of the prior art are not seen in this liquid crystal display 60, and display quality is improved.

The fabrication method of liquid crystal display 60 of the second embodiment of the first invention is next described.

The first method of fabricating liquid crystal display 60 is next described with reference to FIG. 19A to FIG. 19D.

In this method, a vertical alignment layer in which liquid crystal molecules are oriented vertically when no voltage is applied is used in the alignment layers of region 54A and region 54B; and a horizontal alignment layer is used in the alignment layer of region 52, as in the prior art. The liquid crystal material employed has a negative dielectric constant anisotropy.

Figure 19A:
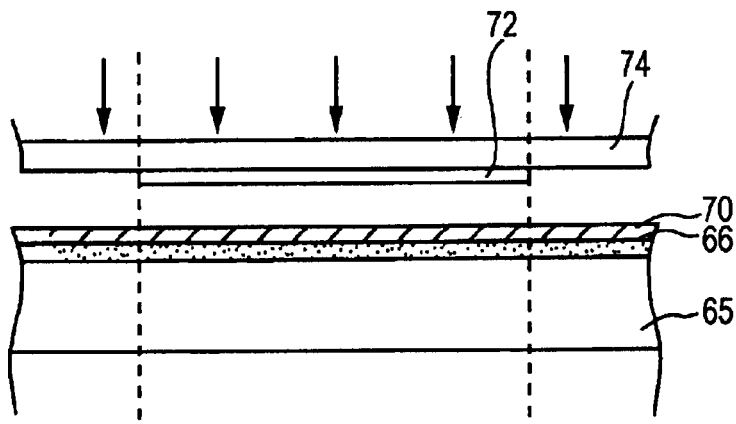
FIG. 19A is a schematic perspective view showing the first step in the fabrication process of the liquid crystal display of the second embodiment.

(1) First, as shown in FIG. 19A, horizontal alignment layer 66 is applied to the entire surface of substrate 65 and then undergoes rubbing at a prescribed rubbing angle θ. Next, photoresist film 70 is applied, and region 52 is then exposed to light through photomask 74 having pattern 72.

Figure 19B:
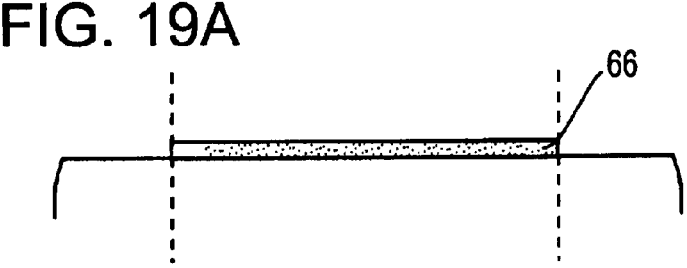
FIG. 19B is a schematic perspective view showing the second step in the fabrication process of the liquid crystal display of the second embodiment.

(2) The photoresist and horizontal alignment layer 66 of regions other than region 52 is then removed by wet etching using an alkali liquid. Photoresist film 70 of region 52 is then stripped off, and as shown in FIG. 19B, a patterned horizontal alignment layer 66 is formed on region 52.

Figure 19C:
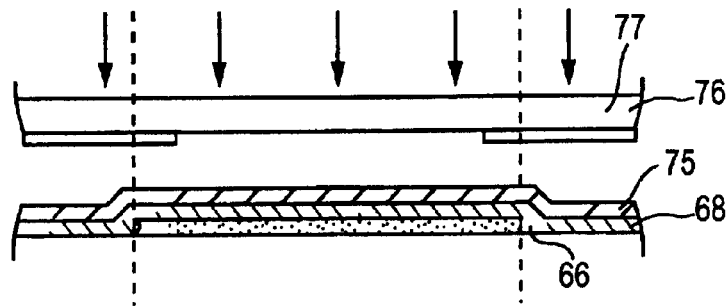
FIG. 19C is a schematic perspective view showing the third step in the fabrication process of the liquid crystal display of the second embodiment.

(3) Next, vertical alignment layer 68 is applied to the entire substrate surface as shown in FIG. 19C. Photoresist film 75 is applied, and region 54A and region 54B are exposed to light using photomask 77 having pattern 76. As the material for vertical alignment layer 68, for example, Nissan Chemicals (KK) product SE1211 may be used.

Figure 19D:
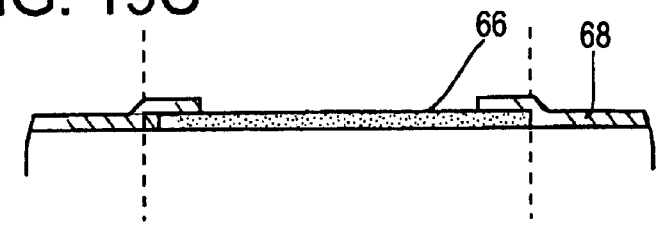
FIG. 19D is a schematic perspective view showing the fourth step in the fabrication process of the liquid crystal display of the second embodiment.

(4) The photoresist and vertical alignment layer 68 are next patterned by etching as shown in FIG. 19D to obtain the desired first alignment layer 62 and second alignment layer 64.

In cases in which no problem is presented by a difference in level of the alignment layer between region 52 and region 54A and 54B alongside the signal line, the patterning of step (2) may be omitted.

The order of formation of horizontal alignment layer 66 and vertical alignment layer 68 may be the reverse of this embodiment, vertical alignment layer 68 first being applied and patterned, and then horizontal alignment layer 66 being applied, rubbed, and patterned. In addition, an optical orienting method may be used to establish initial orientation of horizontal alignment layer 66 rather than a rubbing method.

A second method of fabricating liquid crystal display 60 is next described with reference to FIGS. 20A–20C.

Figure 20A:
FIG. 20A is a schematic perspective view showing the first step of another fabrication process of liquid crystal display according to the second embodiment.

(1) First, horizontal alignment layer 66 is applied to the entire surface of substrate 65, as shown in FIG. 20A.

Figure 20B:
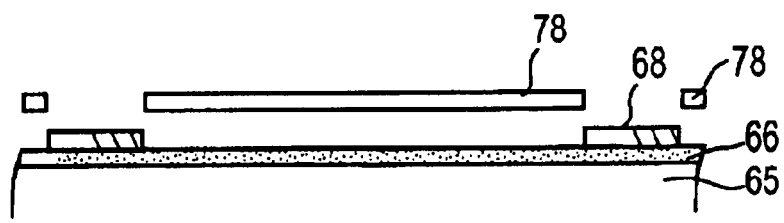
FIG. 20B is a schematic perspective view showing the second step of another fabrication process of liquid crystal display according to the second embodiment.
Figure 20C:
FIG. 20C is a schematic perspective view showing the third step of another fabrication process of liquid crystal display according to the second embodiment.
Figure 21:
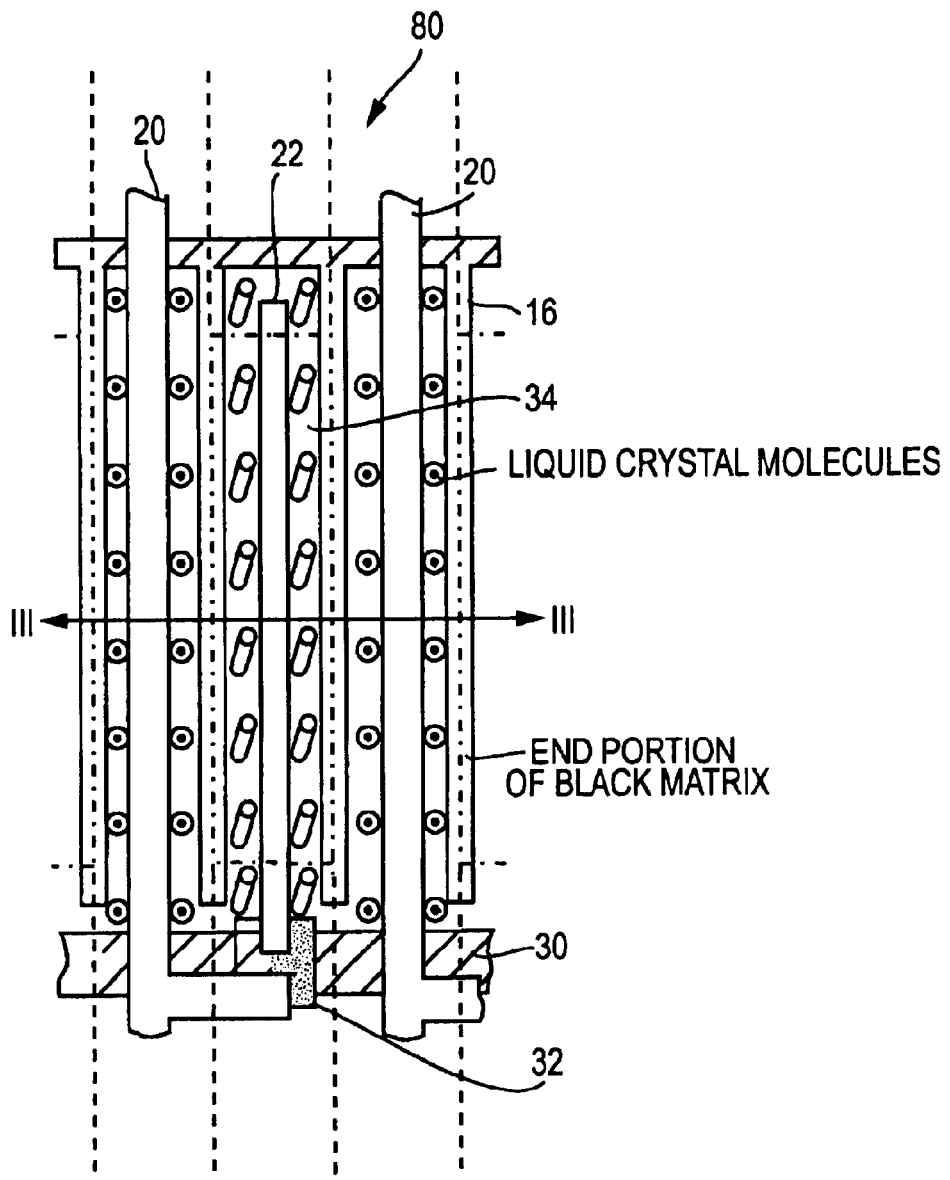
FIG. 21 is a plan view showing the construction of one pixel of a liquid crystal display according to an embodiment of the second invention of the present invention.
Figure 22:
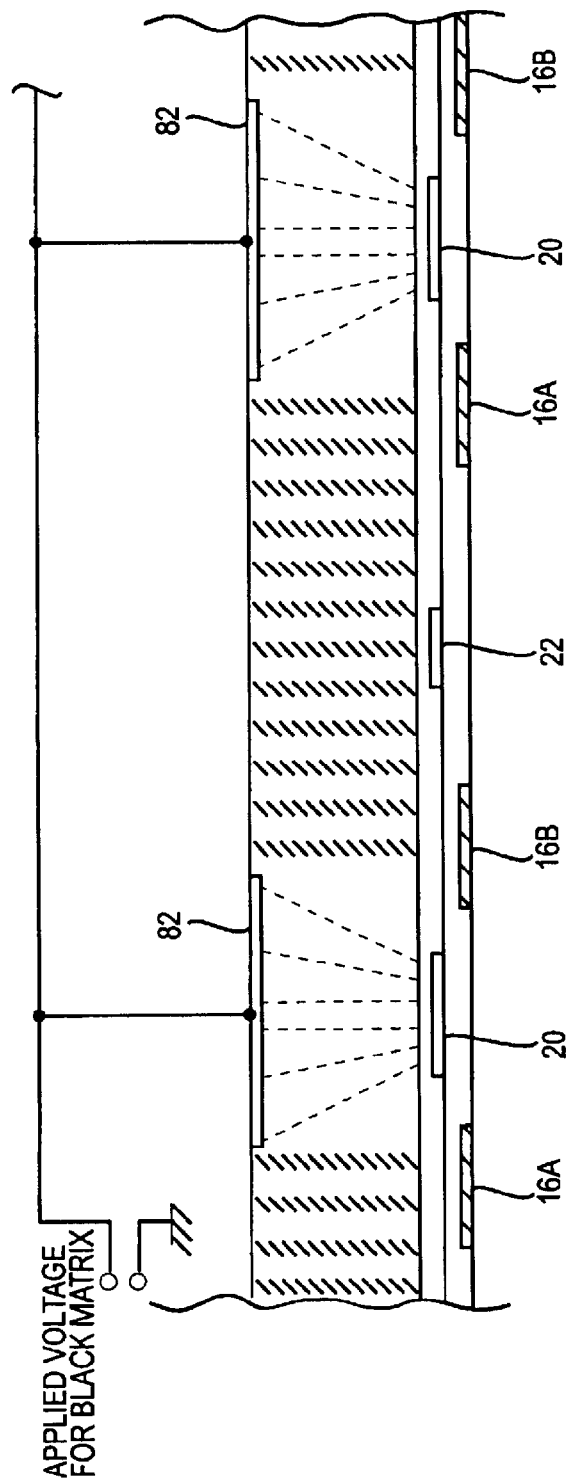
FIG. 22 is a sectional view at line III—III of the liquid crystal display shown in FIG. 21.

(2) Next, vertical alignment layer 68 is formed on portions of horizontal alignment layer 66 of region 54A and region 54B using printing plate 78 having a prescribed aperture pattern, as shown in FIG. 20B (3) Horizontal alignment layer 66 next undergoes rubbing at a prescribed rubbing angle, and in this way, desired first alignment layer 62 and second alignment layer 64 can be obtained as shown in FIG. 20C.

If a difference in level on the alignment layer between region 54A and region 54B alongside signal lines and region 52 presents a problem, the pattern formation of horizontal alignment layer 66 is preferably carried out by printing plate only on region 52.

The order of formation of horizontal alignment layer 66 and vertical alignment layer 68 may also be the reverse of the order in this embodiment, and the initial orientation of horizontal alignment layer 66 may be established by an optical orientation method rather than by a rubbing method.

In the first embodiment and the second embodiment of the first invention, the alignment process of first alignment layer 51 and 62 and second alignment layer 53 and 64 was carried out by partitioning between region 52, region 54A, and region 54B. However, region 52 of first alignment layer 51 and 62 and second alignment layer 53 and 64 may be partitioned into region 55, region 55A, and region 55B (see FIG. 9), the same alignment process then carried out for region 55 as was carried out for region 52 in the first embodiment and the second embodiment, and the same alignment process carried out for region 55A, 55B, 54A and 54B as was carried out for region 54A and region 54B in the first embodiment and second embodiment.

Explanation is next presented regarding an embodiment of the second invention of the present invention with reference to FIG. 21 to FIG. 24. With the exception of a difference in the structure of black matrix 82, liquid crystal display 80 according to an embodiment of the second invention has basically the same construction as IPS liquid crystal display 10 of the prior art described with reference to FIG. 1 and FIG. 2. Explanation is therefore presented using the same reference numerals for parts that are identical to those in the prior-art example. In addition, the liquid crystal used in this embodiment has a positive dielectric constant anisotropy.

In the embodiment of the second invention, black matrix 82 is made of a conductor such as metal. Either a direct-current voltage having a potential 10–20 V higher, or 10–20 V lower, than the average value of the signal potential of signal line 20, or an alternating voltage that reverses between positive and negative, is applied to black matrix 82. The signal potential of signal lines 20 is 0 V during black display and 6.5 V during white display, the potential of pixel electrodes 22 is 0 V during black display and 6.5 V during white display, and the potential of common electrodes 16 is always 0 V.

A strong field perpendicular to first glass substrate 12 and second glass substrate 14 is thus generated in the region around signal line 20. The direction of the director of the liquid crystal is therefore always oriented in a direction substantially perpendicular to the substrate.

In this embodiment, moreover, the rubbing angle of first alignment layer 28 on the side of first transparent substrate 13 (see FIG. 2) and second alignment layer 42 of second transparent substrate 15 (see FIG. 2) is the same as in the prior art, and can be any angle greater than 0° and less than 90°.

Figure 23:
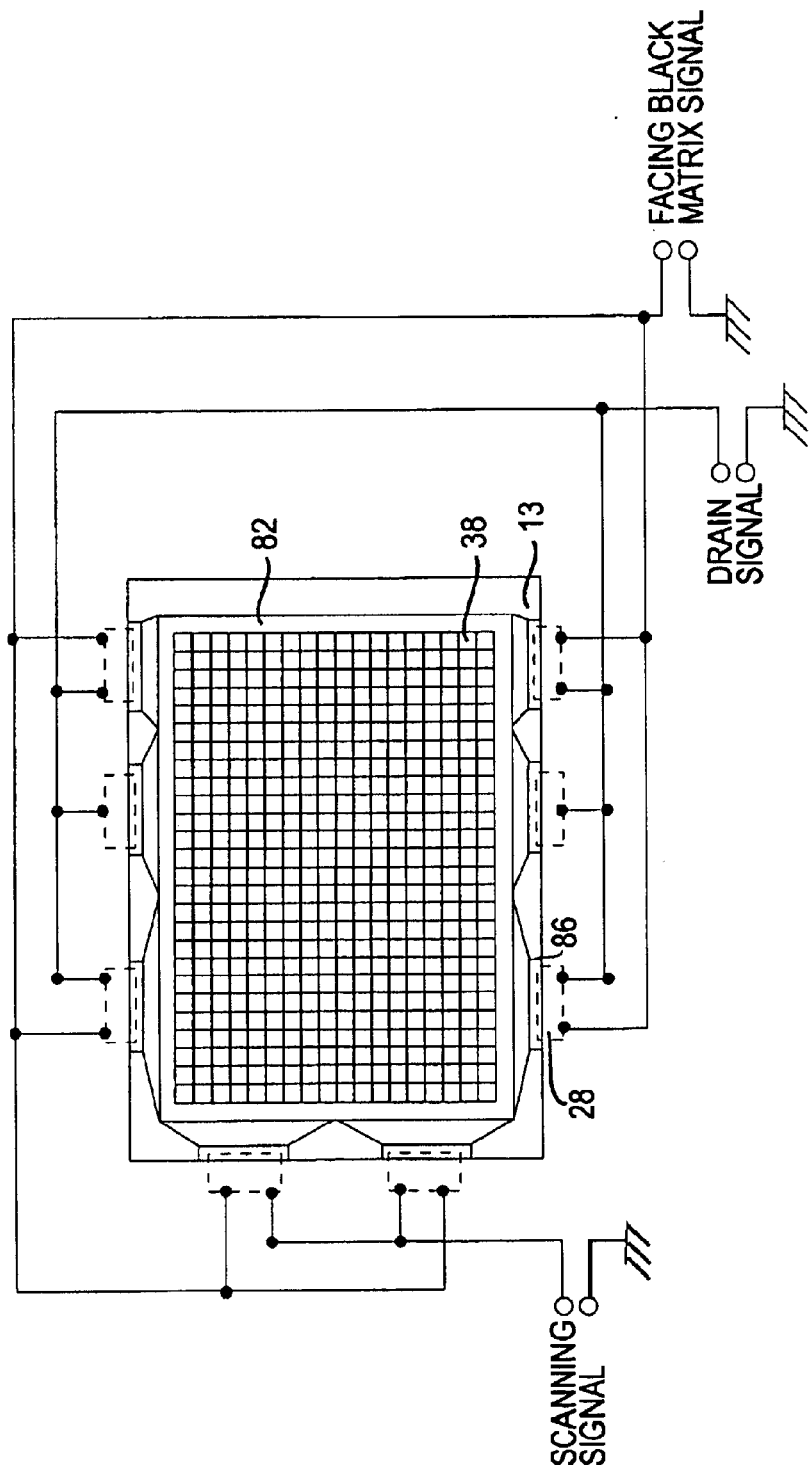
FIG. 23 is an overall schematic view of a pixel unit of an embodiment of the second invention.
Figure 24:
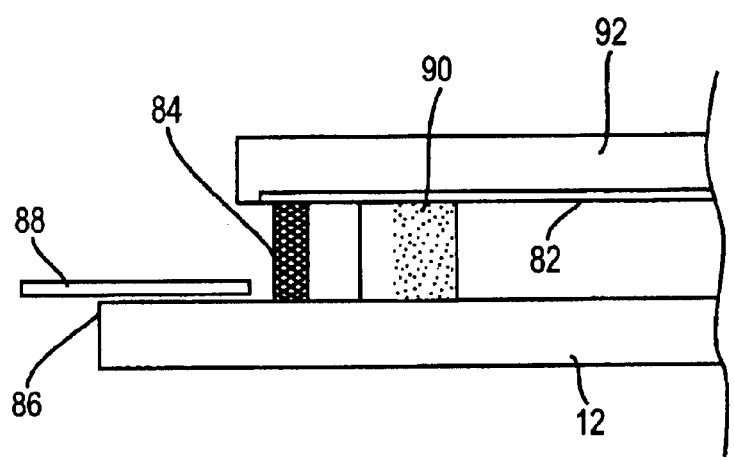
FIG. 24 is a partial sectional view of FIG. 23.

The construction of the means for applying voltage to black matrix 82 is next described with reference to FIG. 23 and FIG. 24.

The end of black matrix 82 is connected to terminal 86 of first glass substrate (TFT substrate) 12 by way of a conductive material, for example, silver paste 84. The interior, including liquid crystal component layer 44, is sealed by seal 90. In addition, the part identified as "92" in FIG. 24 is a color filter substrate, which is the second substrate.

In concrete terms, silver paste installation points of TFT substrate 12 and terminal 86 are first linked by a metal pattern (not shown). TCP 88 is next affixed to terminal 86, and a direct-current voltage 10–20 V higher, or 10–20 V lower, than the average value of the potential of a drain signal, or an AC voltage having a long period of, for example, one positive/negative reversal per hour, is applied to TCP 88.

Figure 25:
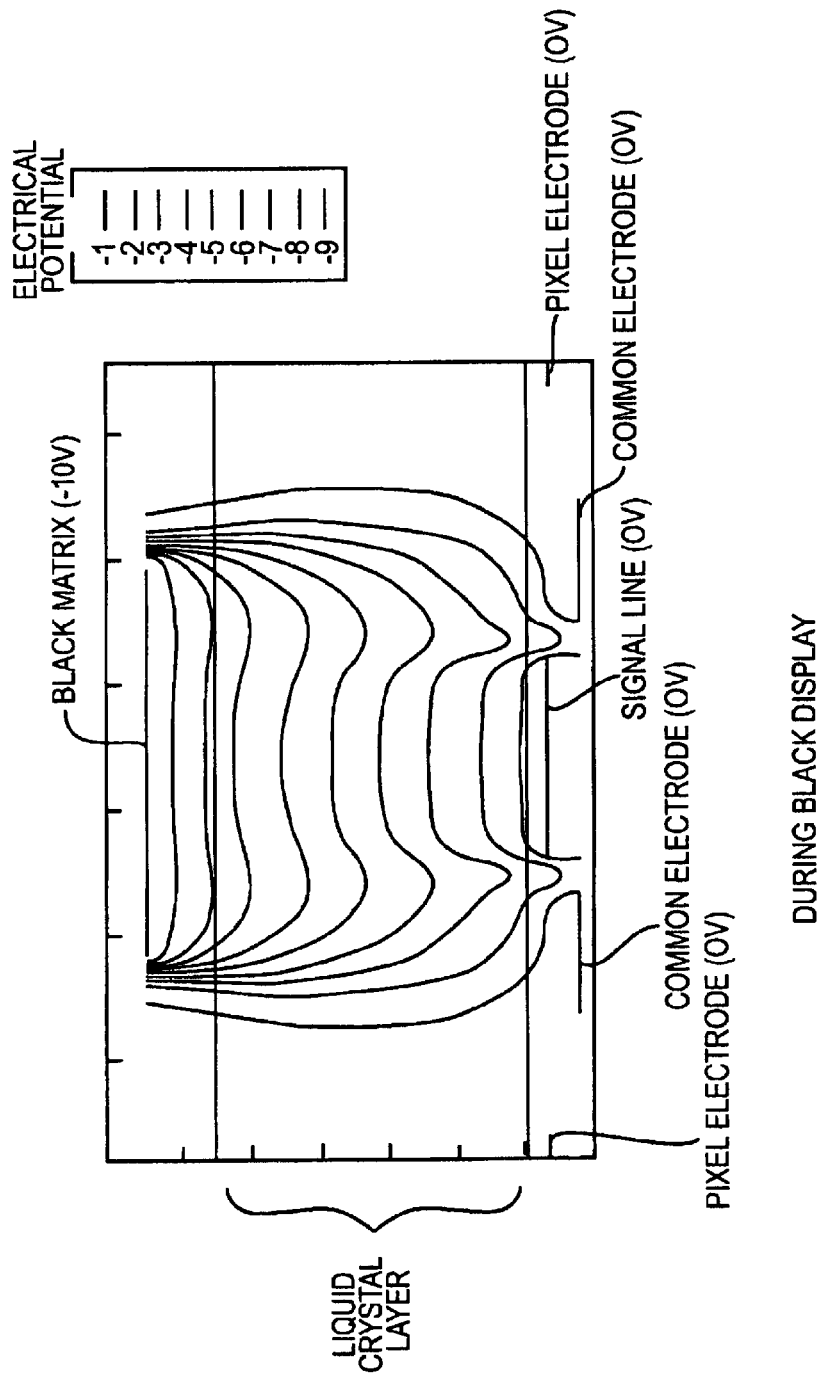
FIG. 25 is an electric potential chart of the liquid crystal layer below the black matrix when displaying black in an embodiment of the second invention.
Figure 26:
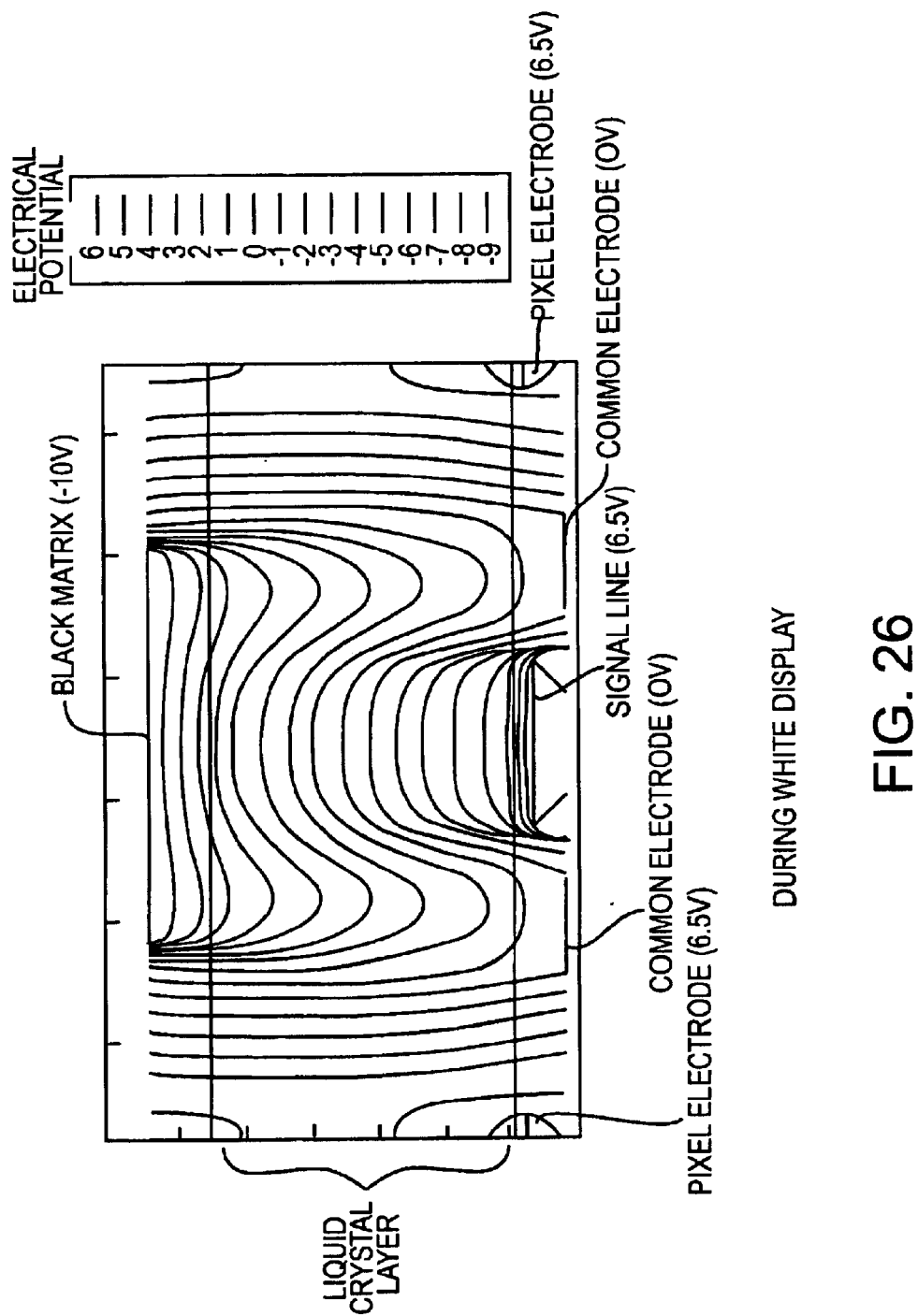
FIG. 26 is an electric potential chart of the liquid crystal layer below the black matrix when displaying white in an embodiment of the second invention.

The action of liquid crystal display 80 according to an embodiment of the second invention is next explained with reference to FIG. 25 and FIG. 26. FIG. 25 and FIG. 26 show the calculated potential during black display and during white display in region 54A and 54B, i.e., the liquid crystal component layer below black matrix 82. A potential of –10 V is set to black matrix 82, and potentials of 0 V during black and 6.5 V during white are set to the signal lines.

Figure 27:
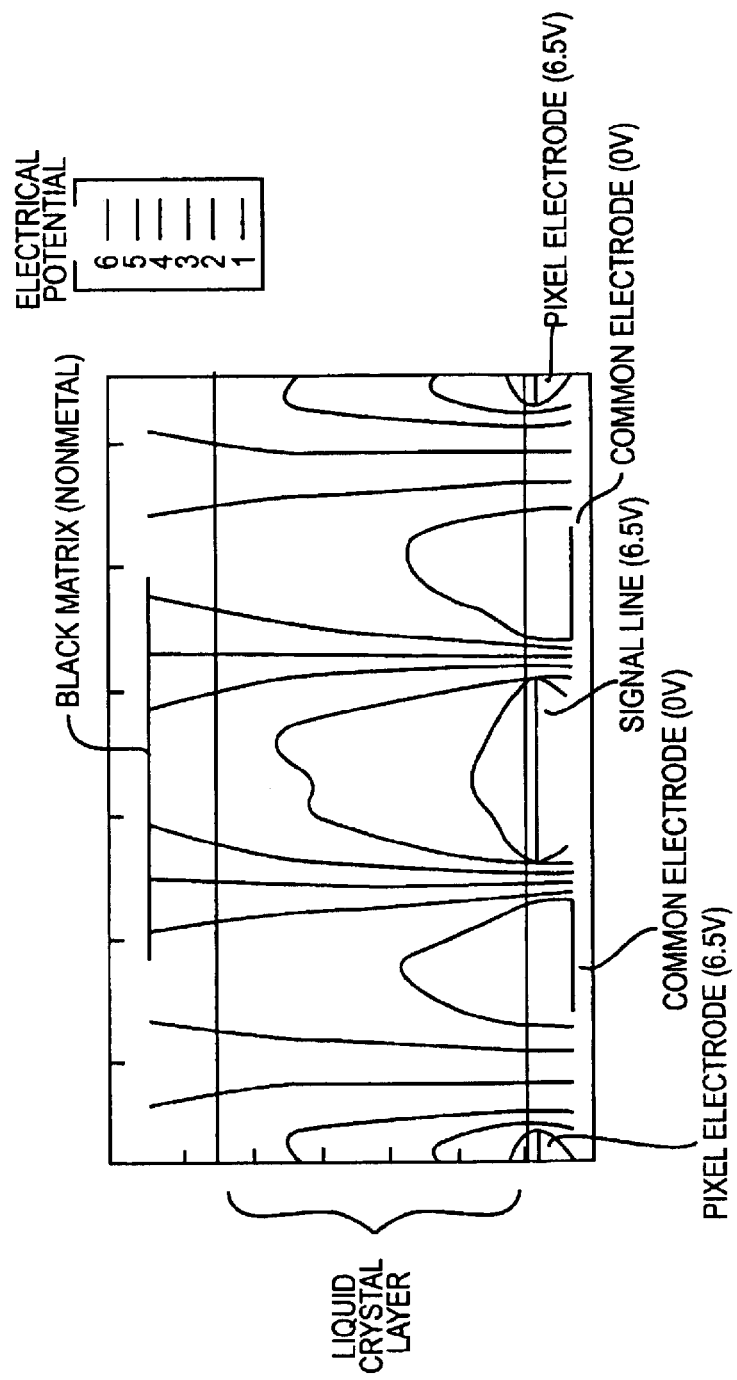
FIG. 27 is an electric potential chart of the liquid crystal layer below the black matrix when displaying white in the prior art.

In a liquid crystal material for which $\Delta\in$ is greater than 0 and the field direction is a direction perpendicular to an equipotential line, the longitudinal direction of the liquid crystal molecules tends to align in the direction of the field. Compared with the potential in the prior-art example shown in FIG. 27, a strong field is generated in a vertical direction alongside the signal line in FIG. 25 and FIG. 26. The liquid crystal molecules therefore stand vertical and are therefore not as prone as the prior art example to influence from the horizontal transverse field produced between the signal lines and common electrodes. It can also be seen from FIG. 25 and FIG. 26 that the potential of the black matrix does not disturb the horizontal transverse field in the aperture region.

Skew of the equipotential line over electrodes is caused by disclination of the liquid crystal molecules.

In the calculation of potential in the prior art, the black matrix was treated as nonmetallic for the sake of expediency.

Figure 5A:
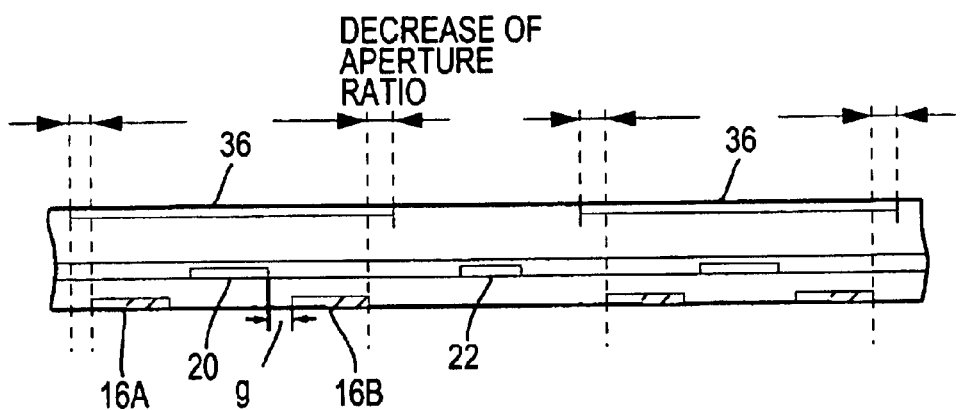
FIG. 5A is a sectional view of a pixel for illustrating the problem of the prior-art method for preventing display defects.
Figure 5B:
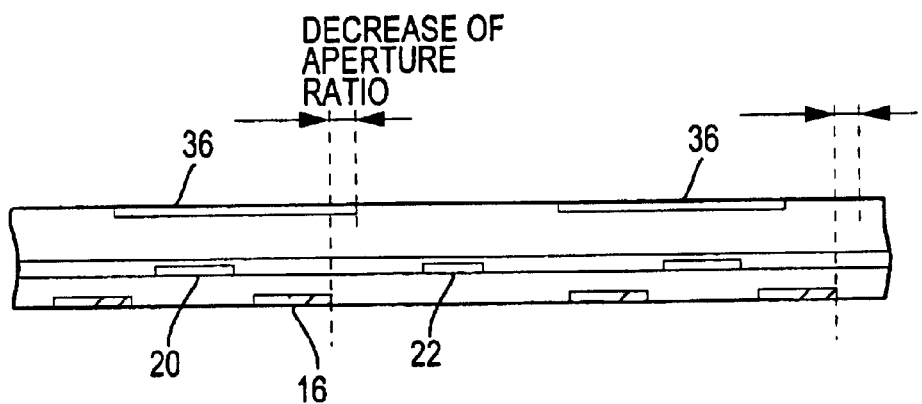
FIG. 5B is a sectional view of a pixel for illustrating the problem of the prior-art method for preventing display defects.
Figure 6A:
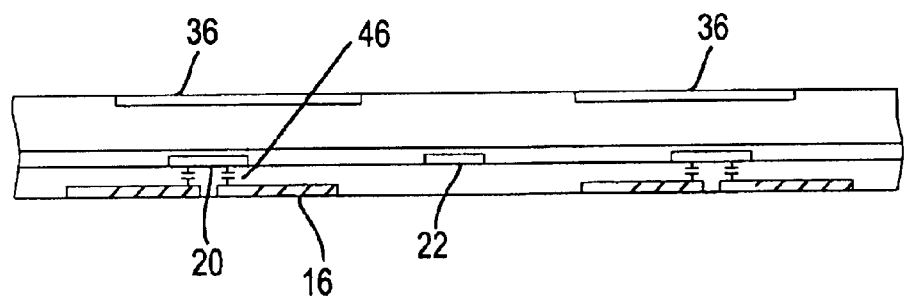
FIG. 6A is a sectional view of a pixel for illustrating the problem of another prior-art method for preventing display defects.
Figure 6B:
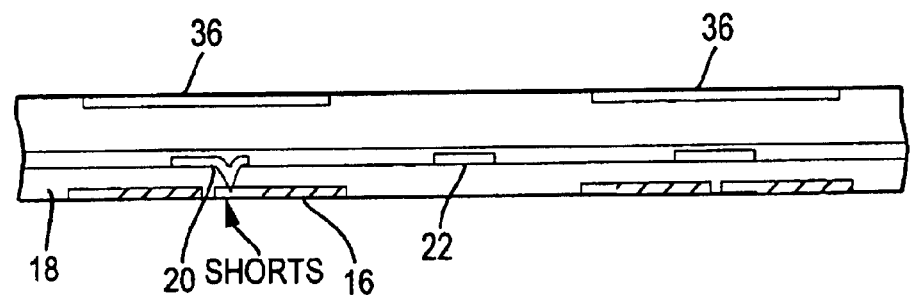
FIG. 6B is a sectional view of a pixel for illustrating the problem of another prior-art method for preventing display defects.
Figure 28:
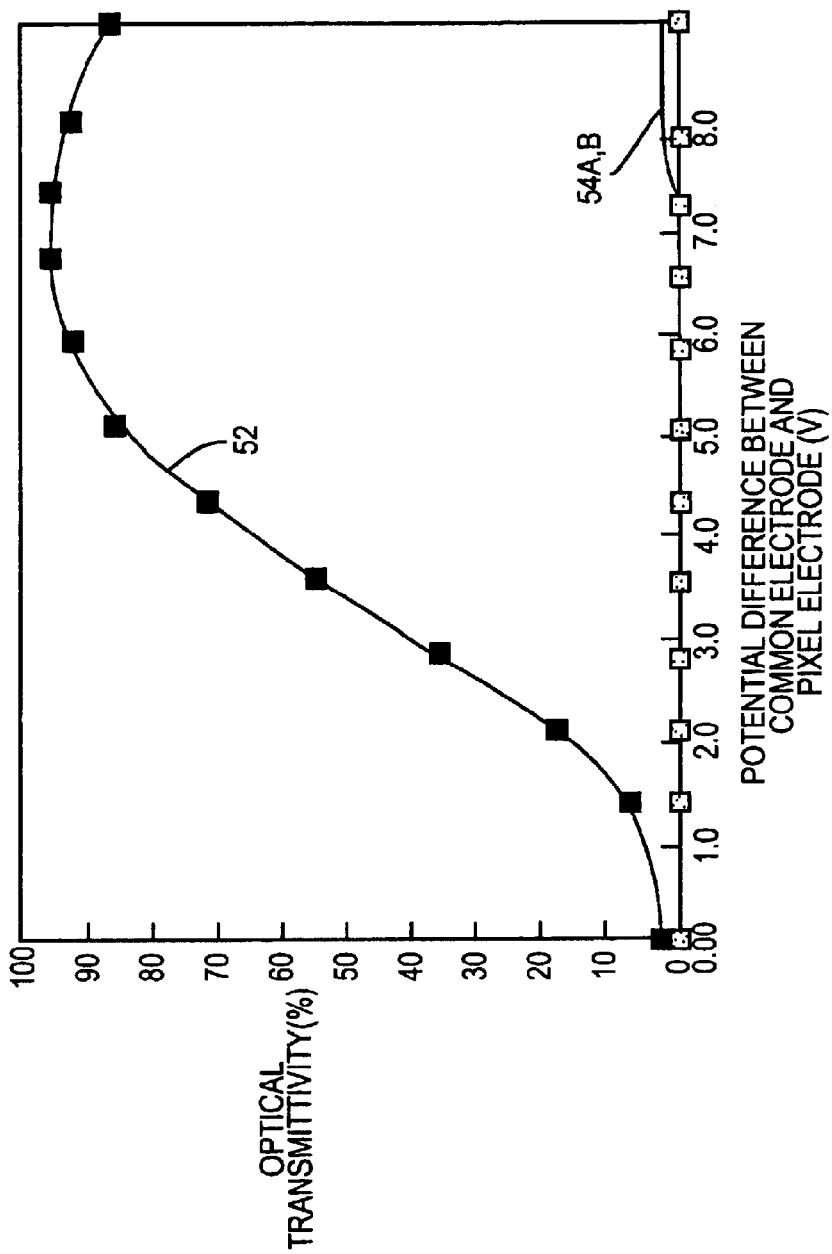
FIG. 28 is a graph regarding a liquid crystal display according to an embodiment of the second invention and shows the relation between the difference in electric potential between common electrodes and pixel electrodes and the optical transmittivity (%) when the amount of light emitted from the sheet polarizer on the side of the first glass substrate is 100.
Figure 29:
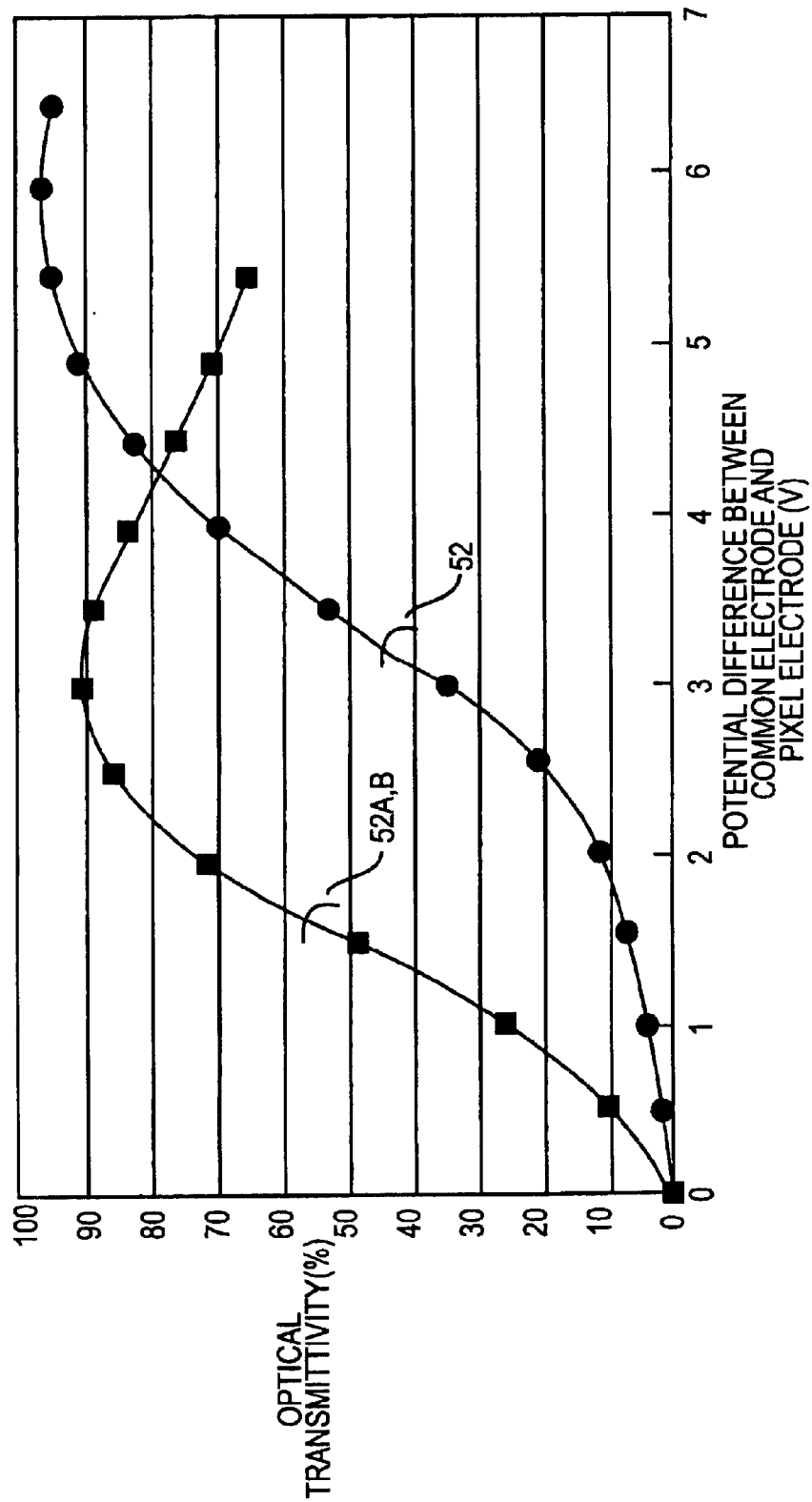
FIG. 29 is a graph regarding a liquid crystal display according to the prior art and shows the relation between the difference in electric potential between common electrodes and pixel electrodes and the optical transmittivity (%) when the amount of light emitted from the sheet polarizer on the side of the first glass substrate is 100.

As shown in FIG. 28 and similar to FIG. 12, the above-described construction results in luminance of the region alongside signal lines (region g in FIG. 5A) that is uniform (nearly black) regardless of the rise and fall in the potential of the signal lines or the amount of space between the signal lines and common electrodes, in contrast with the prior-art example shown in FIG. 29. As a result, the vertical crosstalk and stepping non-uniformity present in the prior art when viewing from an angle are not present in this liquid crystal display 80, and the display quality is improved.

Explanation is next presented regarding a first example of application of the first embodiment and second embodiment of the first invention as well as the embodiment of the second invention.

Figure 30:
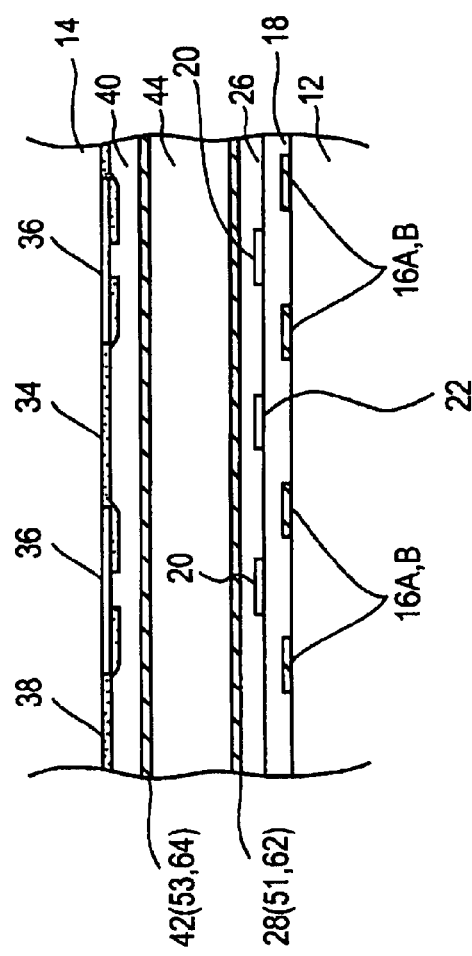
FIG. 30 is a sectional view of an example of application of a substrate.

Although pixel electrodes 22 extend parallel to signal lines 20 over common electrodes 16 with an interposed insulating film 18 as shown in FIG. 8 in the first embodiment and second embodiment of the first invention as well as in the embodiment of the second invention, the invention is not limited to this configuration, and for example, pixel electrodes 22 may extend over first glass substrate 12 arranged parallel with common electrodes 16A and 16B as shown in FIG. 30.

Explanation is next given regarding a second example of application of the first embodiment and the second embodiment of the first invention as well as the embodiment of the second invention.

Although first alignment layer and second alignment layer were partitioned into region 52, region 54A, and region 54B in the first embodiment and second embodiment of the first invention, the invention is not limited to this form, and the first alignment layer and the second alignment layer may be partitioned into region 55 and regions other than region 55, the alignment process applied to region 52 may be applied to region 55, and the alignment process applied to region 54A and region 54B may be applied to the regions other than region 55. In addition, partitioning between the signal line region and regions other than the signal line region is also possible, and the alignment process applied to region 54A and region 54B may be applied to the signal line and the region around the signal line, and the alignment process applied to region 52 may be applied to the regions other than the signal line and the region around the signal line.

According to the present invention, the luminance of regions other than the aperture region, i.e., the luminance of regions alongside the signal lines, can be made uniform (nearly black) regardless of the rise and fall in the potential of the signal lines or the amount of space between the signal lines and common electrodes by: (1) making the direction of initial orientation of the liquid crystal in regions other than the aperture region orthogonal or parallel to the longitudinal direction of the pixel electrodes; (2) making the direction of initial orientation of the liquid crystal in regions other than the aperture region orthogonal to the substrate; and (3) providing a large potential difference between the light-shielding layer and signal lines and making the direction of the liquid crystal in regions other than the aperture region orthogonal to the substrate.

Display defects such as vertical crosstalk and stepping non-uniformity that were seen in liquid crystal displays of the prior art when viewed from an angle are thus not visible in a liquid crystal display according to the present invention, and the quality of display of the liquid crystal display is improved.

It is to be understood, however, that although the characteristics and advantages of the present invention have been set forth in the foregoing description, the disclosure is illustrative only, and changes may be made in the arrangement of the parts within the scope of the appended claims.

What is claimed is:

1. A liquid crystal display device comprising
    a first transparent substrate and a second transparent substrate arranged to confront each other, and
    a liquid crystal component layer sealed between said first transparent substrate and said second transparent substrate,
        said first transparent substrate being provided with a transparent insulating substrate,
        a plurality of scan lines,
        a plurality of signal lines provided perpendicularly to each of said scan lines,
        a plurality of pixels arranged in matrix form surrounded by said scan lines and said signal lines,
        a plurality of common electrodes provided substantially parallel at both sides of said signal lines,
        pixel electrodes provided between common electrodes at each of said pixels,
        switching elements connected to said signal lines that individually control electric fields applied to said pixel electrodes of said pixels,
        common lines that supply a prescribed electric potential to said common electrodes,
    a first alignment layer formed on the highest layer of said first transparent substrate,
        a second alignment layer formed on the highest layer of said second transparent substrate,
    said signal lines including adjacent regions, said signal lines and said adjacent regions defining signal line regions, and
    said pixels including apertures, said apertures and a part of said pixel electrodes defining pixel aperture regions,
    alignment direction of said first alignment layer at said signal line regions differing from alignment direction of said first alignment layer at said pixel aperture regions, and
    alignment direction of said second alignment layer at said signal line regions differing from alignment direction of said second alignment layer at said pixel aperture regions.

2. A liquid crystal display device according to claim 1, wherein,
    said liquid crystal component has a positive dielectric constant anisotropy, and wherein the alignment process of said signal line regions of said first alignment layer and said second alignment layer is carried out in a direction substantially orthogonal to the longitudinal direction of said pixel electrodes.

3. A liquid crystal display device according to claim 2 wherein an alignment process is carried out such that the alignment of said pixel aperture regions of said first alignment layer and said second alignment layer has an inclination of any angle θ that is neither orthogonal nor parallel to the longitudinal direction of said pixel electrodes.

4. A liquid crystal display device according to claim 2 wherein said first alignment layer and said second alignment layer are alignment layers that can be aligned by light, and are processed by polarized light such that each of said signal line regions and said pixel aperture regions of these alignment layers undergoes a controlled alignment process.

5. A liquid crystal display device according to claim 2 wherein the alignment process of regions other than said signal line regions and said pixel aperture regions of said first alignment layer and said second alignment, layer is the same alignment process as either the alignment process of said signal line regions or the alignment process of said pixel aperture regions.

6. A liquid crystal display device according to claim 2 wherein said pixel electrodes and said signal lines both extend over said common electrodes with an insulating film, are parallel to said common electrodes, and are separated from each other.

7. A liquid crystal display device according to claim 2 wherein said common electrodes and said pixel electrodes extend parallel to each other and separated from each other; and said signal lines extend parallel to said common electrodes and over said common electrodes and said pixel electrodes with an insulating film.

8. A liquid crystal display device according to claim 1, wherein, said liquid crystal component has a negative dielectric constant anisotropy, and wherein the alignment process of said signal line regions of said first alignment layer and said second alignment layer is carried out in a direction approximately parallel to the longitudinal direction of said pixel electrodes.

9. A liquid crystal display device according to claim 8 wherein an alignment process is carried out such that the alignment of said pixel aperture regions of said first alignment layer and said second alignment layer has an inclination of any angle θ that is neither orthogonal nor parallel to the longitudinal direction of said pixel electrodes.

10. A liquid crystal display device according to claim 8 wherein said first alignment layer and said second alignment layer are alignment layers that can be aligned by light, and are processed by polarized light
such that each of said signal line regions and said pixel aperture regions of these alignment layers undergoes a stipulated alignment process.

11. A liquid crystal display device according to claim 8 wherein the alignment process of regions other than said signal line regions and said pixel aperture regions of said first alignment layer and said second alignment layer is the same alignment process as either the alignment process of said signal line regions or the alignment process of said pixel aperture regions.

12. A liquid crystal display device according to claim 8 wherein said pixel electrodes and said signal lines both extend over said common electrodes with an insulating film, are parallel to said common electrodes, and are separated from each other.

13. A liquid crystal display device according to claim 8 wherein said common electrodes and said pixel electrodes extend parallel to each other and separated from each other; and said signal lines extend parallel to said common electrodes and over said common electrodes and said pixel electrodes with an insulating film.

14. A liquid crystal display device according to claim 1 wherein, said liquid crystal component has a negative dielectric constant anisotropy, and the alignment of said signal line regions, of said first alignment layer and said second alignment layer is a vertical alignment.

15. A liquid crystal display device according to claim 14 wherein an alignment process is carried out such that the alignment of said pixel aperture regions of said first alignment layer and said second alignment layer has an inclination of any angle θ that is neither orthogonal nor parallel to the longitudinal direction of said pixel electrodes.

16. A liquid crystal display device according to claim 14 wherein said first alignment layer and said second alignment layer are alignment layers that can be aligned by light, and are processed by polarized light
such that each of said signal line regions and said pixel aperture regions of these alignment layers undergoes a stipulated alignment process.

17. A liquid crystal display device according to claim 14 wherein the alignment process of regions other than said signal line regions and said pixel aperture regions of said first alignment layer and said second alignment layer is the same alignment process as either the alignment process of said signal line regions or the alignment process of said pixel aperture regions.

18. A liquid crystal display device according to claim 14 wherein said pixel electrodes and said signal lines both extend over said common electrodes with an insulating film, are parallel to said common electrodes, and are separated from each other.

19. A liquid crystal display device according to claim 14 wherein said common electrodes and said pixel electrodes extend parallel to each other and separated from each other; and said signal lines extend parallel to said common electrodes and over said common electrodes and said pixel electrodes with an insulating film.

20. A liquid crystal display device according to claim 1 wherein an alignment process is carried out such that the alignment of said pixel aperture region of said first alignment layer and said second alignment layer has an inclination of any angle θ that is neither orthogonal nor parallel to the longitudinal direction of said pixel electrode.

21. A liquid crystal display device according to claim 20 wherein the alignment process of regions other than said signal line regions and said pixel aperture regions of said first alignment layer and said second alignment layer is the same alignment process as either the alignment process of said signal line regions or the alignment process of said pixel aperture regions.

22. A liquid crystal display device according to claim 20 wherein said pixel electrodes and said signal lines both extend over said common electrodes with an insulating film, are parallel to said common electrodes, and are separated from each other.

23. A liquid crystal display device according to claim 20 wherein said common electrodes and said pixel electrodes extend parallel to each other and separated from each other; and said signal lines extend parallel to said connection electrodes and over said common electrodes and said pixel electrodes with an insulating film.

24. A liquid crystal display device comprising
a first transparent substrate and
a second transparent substrate arranged to confront each other, and a liquid crystal component layer sealed between said first transparent substrate and said second transparent substrate,
said first transparent substrate being provided with:
a transparent insulating substrate,
pixel electrodes and common electrodes substantially parallel and alternately arranged on said transparent insulating substrate,
a plurality of pixels arranged in matrix form,
scan lines and etching elements that individually control electric fields applied to pixel electrodes of said pixels,
signal lines connected to said switching elements, said signal lines including adjacent regions, said signal lines and said adjacent regions defining signal line regions,
common lines that supply a prescribed electric potential to common electrodes of said pixels and a first alignment layer formed on the highest layer; and
said second transparent substrate being provided with: at least a second alignment layer on the highest layer, and a light-shielding layer having aperture regions of said pixels below said alignment layer, said liquid crystal component having a positive dielectric constant anisotropy,
said first alignment layer and said second alignment layer undergoing an alignment process so as to have an inclination of any angle θ which is neither parallel nor orthogonal to the longitudinal direction of said pixel electrode,
said light-shielding layer being formed from a conductor and
voltage is applied to said light-shielding layer such that the direction of liquid crystal molecules within said liquid crystal component layer in said signal line regions as aligned substantially perpendicular to said first transparent substrate.

25. A liquid crystal display device according to claim 24 wherein voltage impressed to said light-shielding layer is either a direct-current voltage of a potential within a range of 10–20 V higher, or within a range of 10–20 V lower, than the average value of the potential of said signal lines, or an alternating voltage of a long period.

26. A liquid crystal display device according to claim 24 wherein said pixel electrodes and said signal lines extend over said common electrodes with an insulating layer, are parallel to said common electrodes, end separated from each other.

27. A liquid crystal display device according to claim 24 wherein said common electrodes and said pixel electrodes extend parallel and separated from each other, and said signal lines extend parallel to said common electrodes over said common electrodes and said pixel electrodes with an interposed insulating layer.

* * * * *